US008898015B2

(12) United States Patent
Tamai et al.

(10) Patent No.: US 8,898,015 B2
(45) Date of Patent: Nov. 25, 2014

(54) PATH SEARCHING METHOD AND PATH SEARCH DEVICE

(71) Applicant: Fujitsu Limited, Kawasaki (JP)

(72) Inventors: Kyohei Tamai, Kawasaki (JP); Akio Shinagawa, Nakano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/771,579

(22) Filed: Feb. 20, 2013

(65) Prior Publication Data

US 2013/0238240 A1   Sep. 12, 2013

(30) Foreign Application Priority Data

Mar. 12, 2012   (JP) ................................. 2012-054604

(51) Int. Cl.
*G01C 21/10* (2006.01)
*G06N 5/00* (2006.01)
*G01C 21/34* (2006.01)

(52) U.S. Cl.
CPC ................ *G01C 21/34* (2013.01); *G06N 5/003* (2013.01); *G01C 21/3446* (2013.01)
USPC .......................................... 701/527; 701/533

(58) Field of Classification Search
CPC ....................... G01C 21/3446; G01C 21/3469
USPC ................................................. 701/527, 533
See application file for complete search history.

(56) References Cited

FOREIGN PATENT DOCUMENTS

JP      06-52237        2/1994
JP      2008-096334     4/2008

OTHER PUBLICATIONS

E. W. Dijkstra, "A Note on Two Problems in Connexion with Graphs," Numerische Mathematik 1 (1959), pp. 269-271.
P. E. Hart, et al., "A Formal Basis for the Heuristic Determination of Minimum Cost Paths," IEEE Transactions of Systems Science and Cybernetics, vol. SSC-4, No. 2 (Jul. 1968), pp. 100-107.
Cho, Hsun-Jung et al., "Hybrid shortest path algorithm for vehicle navigation," Journal of Supercomputing, vol. 49, No. 2, Dec. 12, 2008, pp. 234-247, XP019733930.
Demeyer, S. et al., "The predecessor and the accounting algorithm speed up shortest path calculations in traffic routing applications," Proceedings of the 13[13] International IEEE Conference on Intelligent Transportation Systems, Sep. 19, 2010, pp. 980-985, XP031792624.
Hahne, Felix et al., "Acceleration of the A*-Algorithm for the Shortest Path Problem in Digital Road Maps," Operations Research Proceedings, vol. 2007, Apr. 28, 2008, pp. 455-460, XP55071033.
Jagadeesh, G. R. et al., "Heuristic Techniques for Accelerating Hierarchical Routing on Road Networks," IEEE Transactions on Intelligent Transportation Systems, vol. 3, No. 4, Dec. 2002, pp. 301-309, XP011074894.
Extended European Search Report dated Jul. 19, 2013 for corresponding European Application No. 13155893.4.

*Primary Examiner* — Thomas G Black
*Assistant Examiner* — Luke Huynh
(74) *Attorney, Agent, or Firm* — Fujitsu Patent Center

(57) ABSTRACT

A computer performs a path search from a first node to a second node by using nodes and links connecting two nodes and to which a cost is set. A first search method is used to search for one node from among nodes to be searched which are adjacent to the searched-for node and have not yet been searched for. Then, the distance between the searched-for node and the second node is recorded, and the searched-for node is recorded as an already-searched-for node. Next, the first search method is changed to a second search method in which a number of nodes to be searched is prevented from increasing according to distances between the second node and two or more searched-for nodes obtained as a result of performing searching and recording plural times. Then, path information is generated according to a node searched for by the second search method.

11 Claims, 27 Drawing Sheets

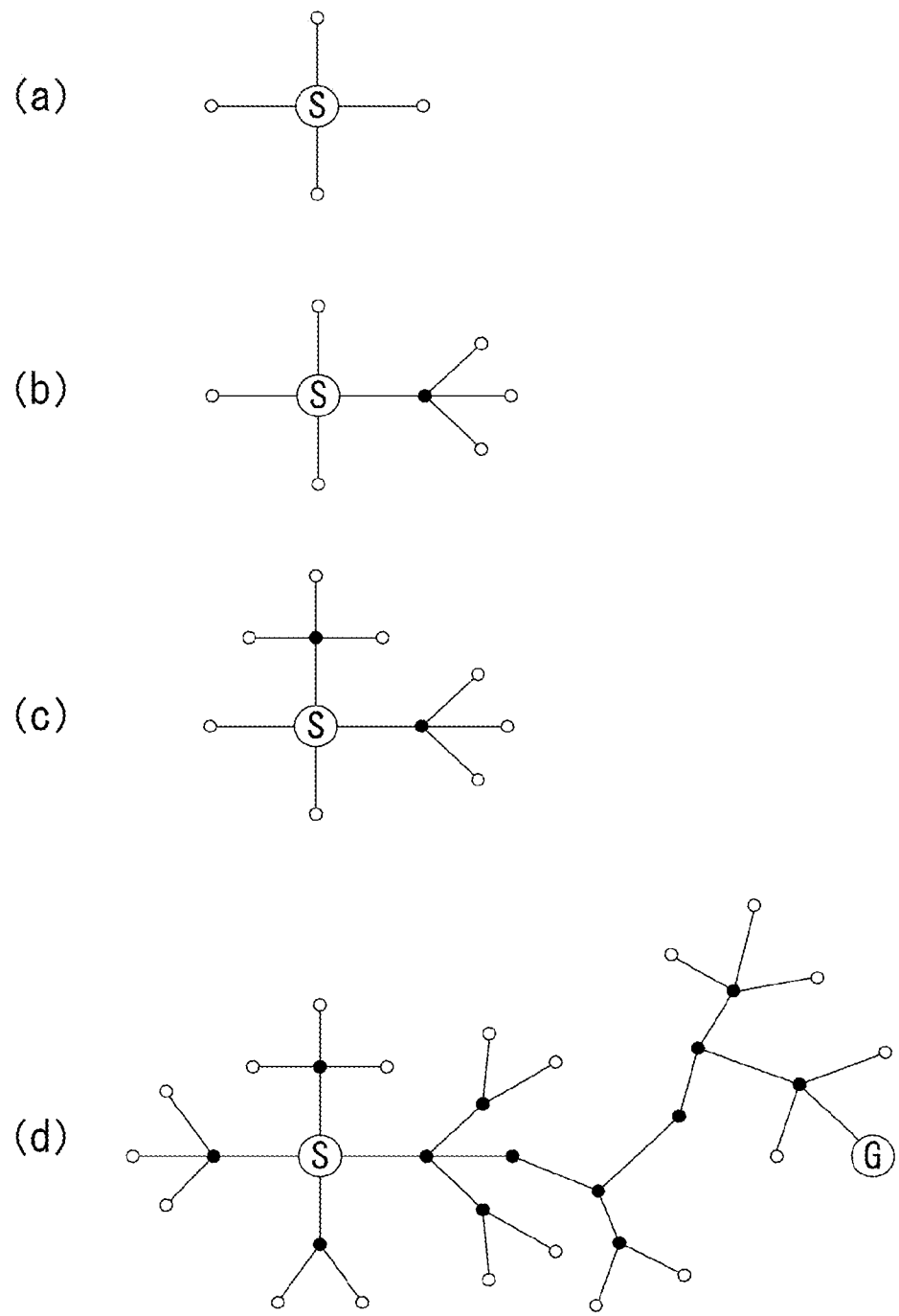
F I G. 1

| NODE | POSITION | ADJACENT NODE |
|------|----------|---------------|
| 001  | (x1, y1) | 002, 003      |
| 002  | (x2, Y2) | 001, 005      |
| ...  | ...      | ...           |

FIG. 3

| LINK | TYPE OF ROAD | LINK LENGTH |
|---|---|---|
| 001-002 | NATIONAL ROAD | 250m |
| 001-003 | PREFECTURAL ROAD | 389m |
| ... | ... | ... |

FIG. 4

| DATE AND TIME | LINK | TRAVEL TIME |
|---|---|---|
| 2012/2/20 9:00:00 | 001-002 | 98 SECONDS |
| 2012/2/20 9:00:00 | 001-003 | 137 SECONDS |
| ... | ... | ... |

FIG. 5

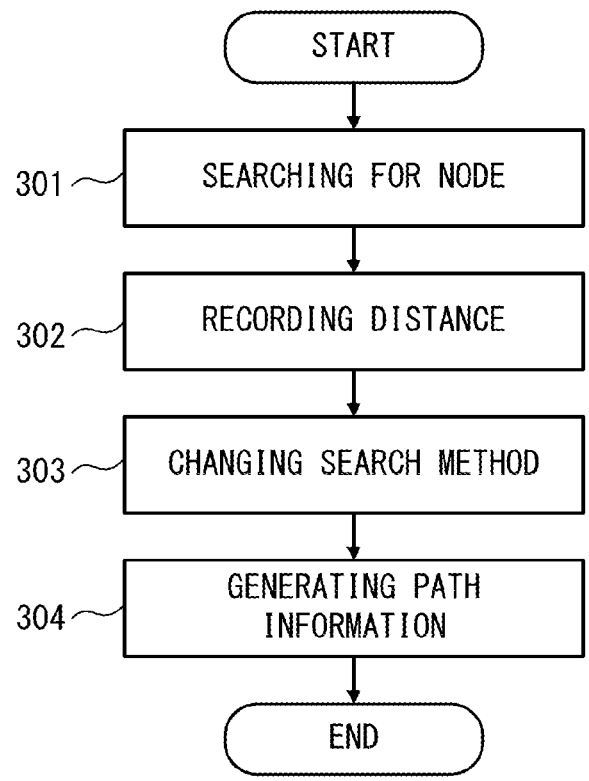
F I G. 7

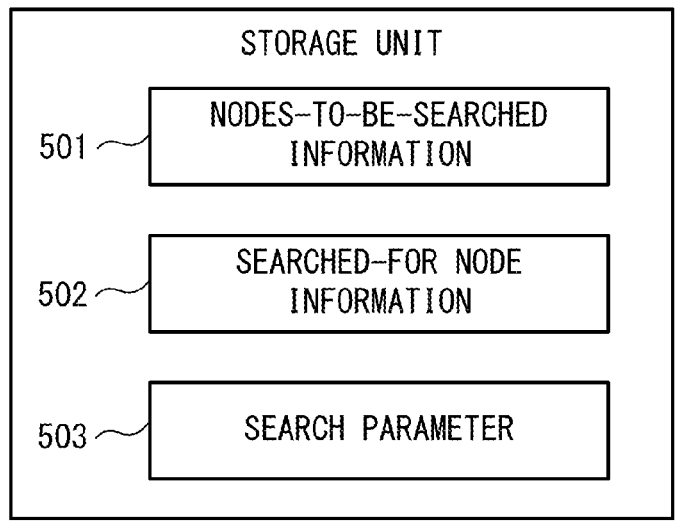
F I G. 9

| GROUP 1 | LOCAL STREETS AND ROADS, CITY STREETS IN GOVERNMENT-DESIGNATED LARGE CITY, PREFECTURAL ROADS, NATIONAL ROADS, EXPRESSWAYS |
|---|---|
| GROUP 2 | PREFECTURAL ROADS, NATIONAL ROADS, EXPRESSWAYS |
| GROUP 3 | NATIONAL ROADS, EXPRESSWAYS |

FIG. 10

| DISTANCE | ROAD NETWORK | THRESHOLD |
|---|---|---|
| $D \leqq D1$ | GROUP 1 | T1 |
| $D1 < D \leqq D2$ | GROUP 2 | T2 |
| $D2 < D$ | GROUP 3 | NONE |

F I G. 1 1

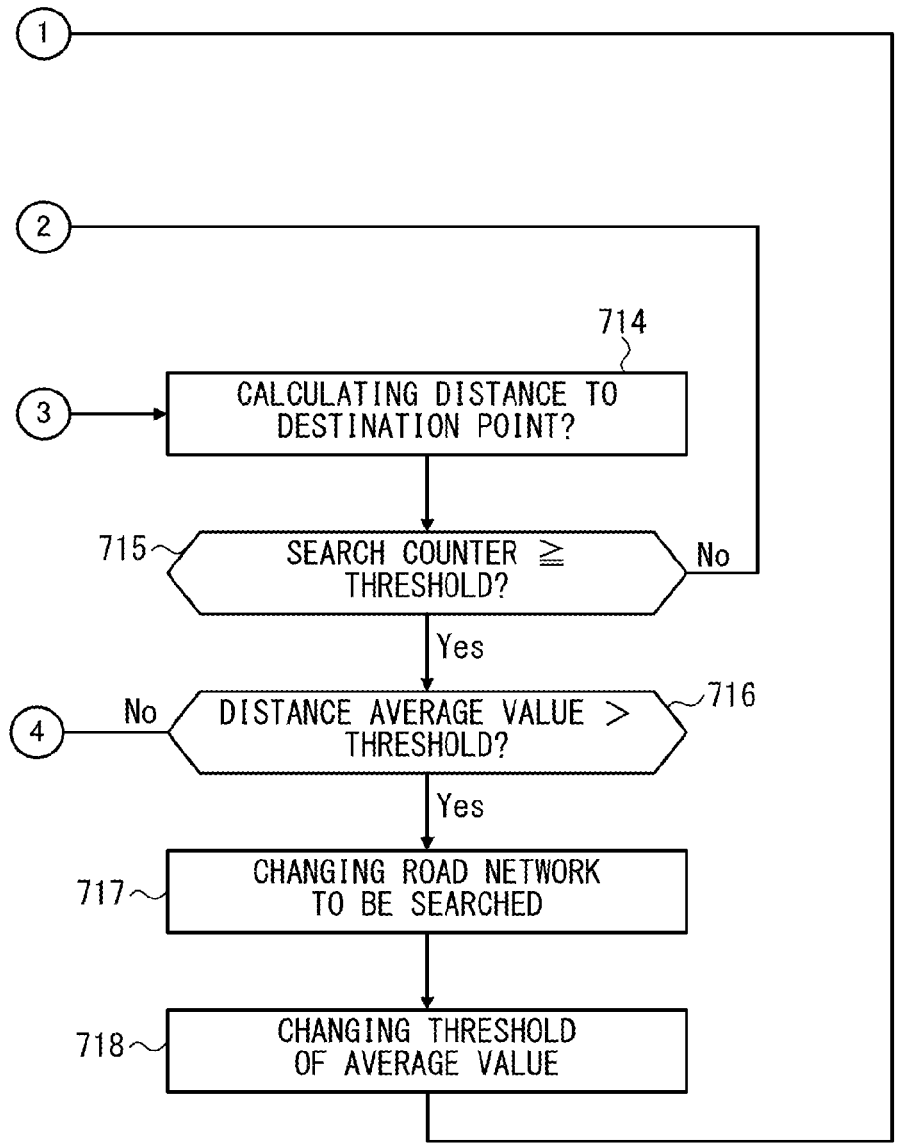
F I G. 1 2 B

| SEARCHED-FOR NODE | TOTAL COST | PREVIOUSLY-PASSED-THROUGH NODE | DISTANCE |
|---|---|---|---|
| 001 | ... | 999 | 120 |
| 002 | ... | 001 | 120 |
| 005 | ... | 002 | 121 |
| ... | ... | ... | ... |

FIG. 13

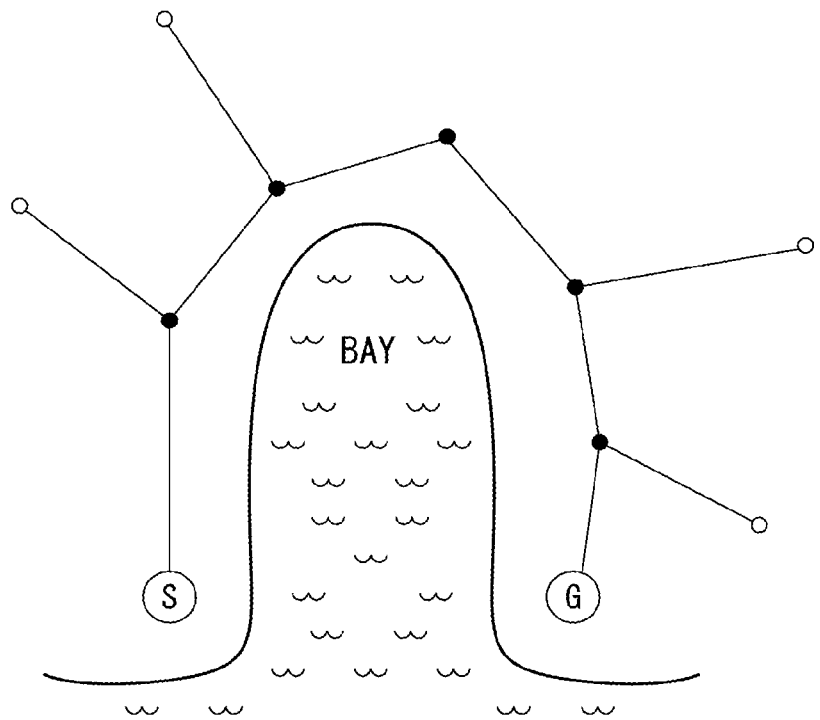
F I G. 1 6

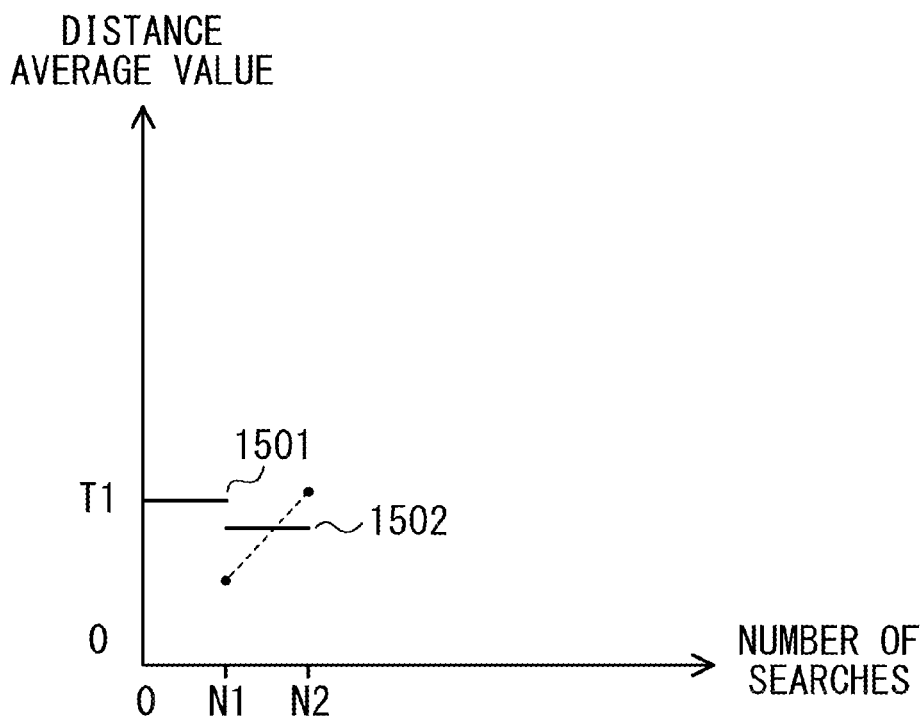
F I G. 1 7

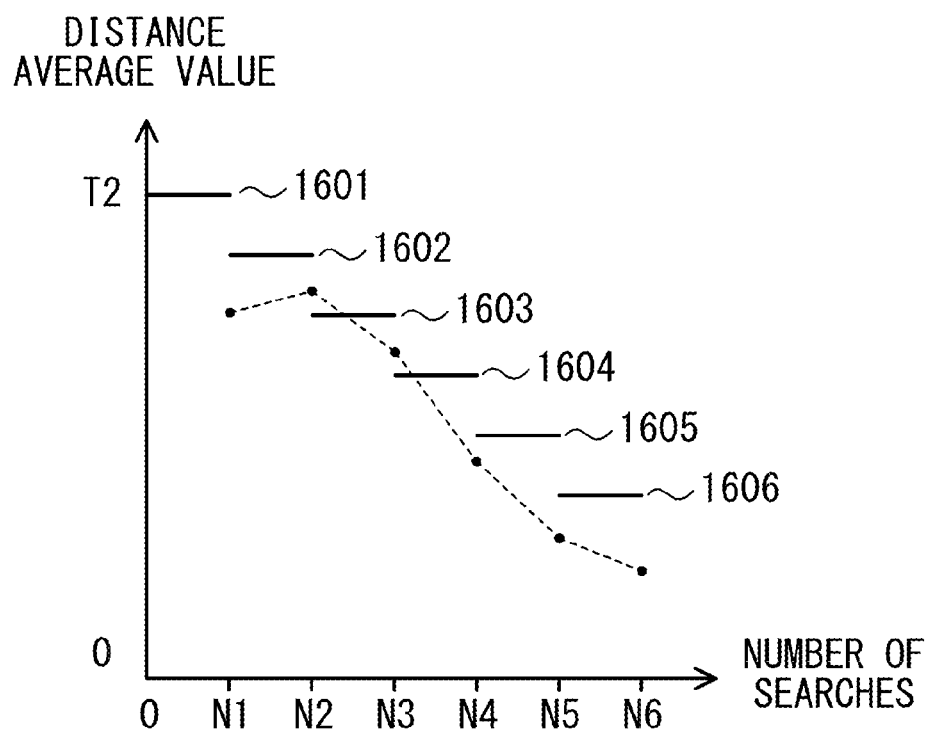
F I G. 1 8

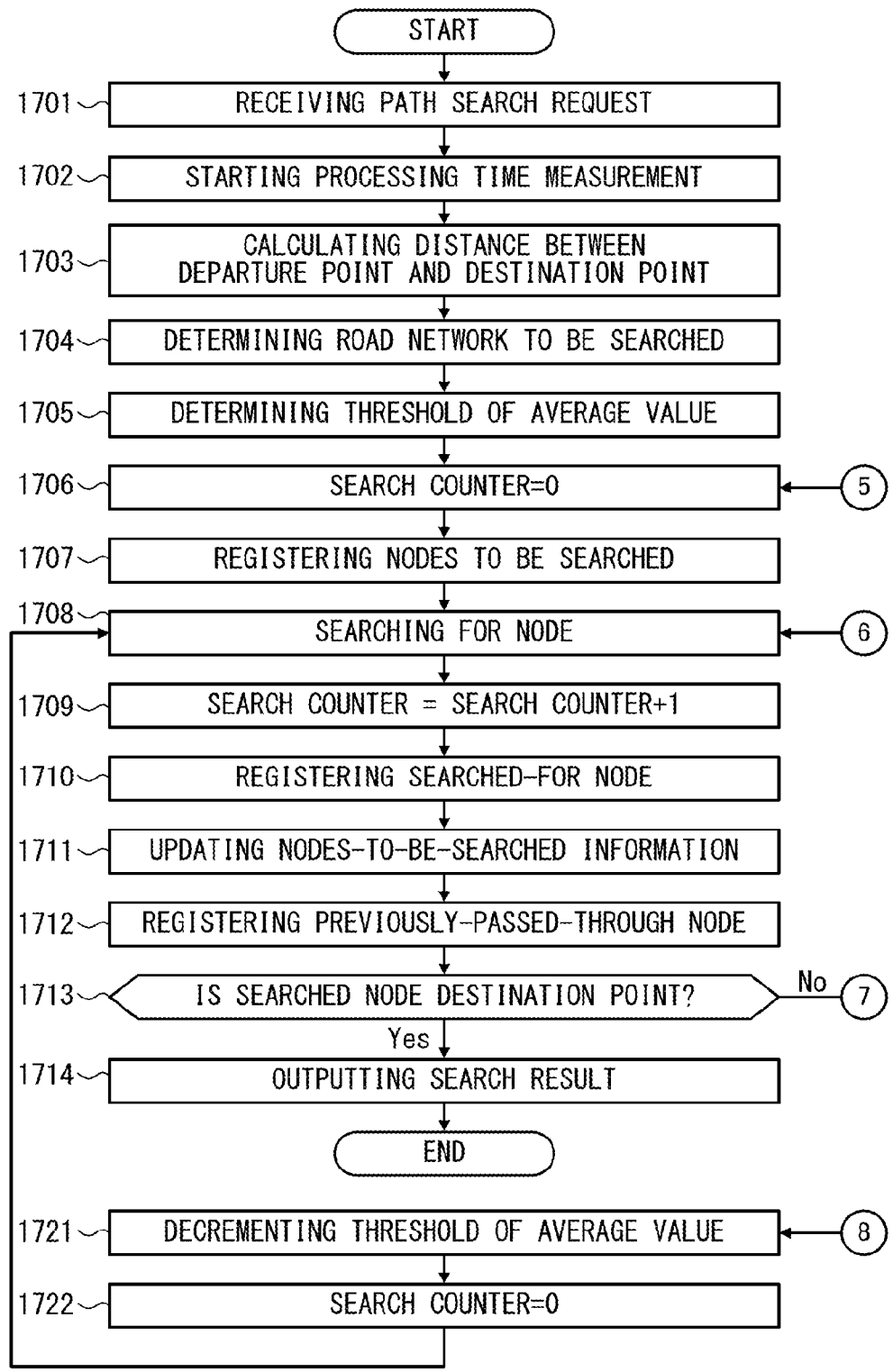
F I G. 1 9 A

| DISTANCE | ROAD NETWORK | THRESHOLD |
|---|---|---|
| $D \leqq D1$ | GROUP 1 | M1 |
| $D1 < D \leqq D2$ | GROUP 2 | M2 |
| $D2 < D$ | GROUP 3 | M3 |

FIG. 20

PATH SEARCHING METHOD AND PATH SEARCH DEVICE

CROSS-REFERENCE TO RELATED APPLICATION

This application is based upon and claims the benefit of priority of the prior Japanese Patent Application No. 2012-054604, filed on Mar. 12, 2012, the entire contents of which are incorporated herein by reference.

FIELD

The embodiments discussed herein relate to a path searching method, a path search device, and a recording medium.

BACKGROUND

Several types of algorithms such as Dijkstra's algorithm and the A* algorithm are known as path searching algorithms that search for a path from a departure node to a destination node.

In Dijkstra's algorithm, a path (link string) where the sum total cost becomes lowest is searched for on a map which is expressed with links that connect nodes, according to the cost information that is set to the links in advance. On road maps, a departure node, a destination node, intersections, or the like are used as nodes, and roads that connects pairs of intersections are used as links. Moreover, the length of a link, the travel time, or the like are used as a cost of each link.

In Dijkstra's algorithm, nodes adjacent to the departure node are firstly regarded as a group of nodes to be searched, and the node reachable at the lowest cost is selected therefrom and determined to be the searched-for node. Next, the searched-for nodes are excluded from the group of nodes to be searched, and a group of nodes reachable via the searched-for nodes are newly added to the group of nodes to be searched. In so doing, the nodes that have been passed through before the searched-for node is reached are recorded as previously passed-through nodes. At this stage, the departure node is the previously passed-through node. When the searched-for node is not the destination node, a node that is reachable from the departure node at the lowest cost is continuously determined from the group of nodes to be searched. Such a searching process is repeated until the destination node is determined to be the searched-for node. The searching process terminates when the destination node is determined to be the searched-for node, and a path that connects the departure node with the destination node at the lowest cost is obtained by tracking back the previously passed-through nodes in order from the destination node.

FIG. 1 illustrates how the search for nodes progresses in the path searching process where Dijkstra's algorithm is used. In FIG. 1, white dots indicate nodes to be searched, and black dots indicate the searched-for nodes. In "(a)" of FIG. 1, four nodes adjacent to a departure node S are registered as nodes to be searched, and in "(b)" and "(c)" of FIG. 1, two or more nodes adjacent to the searched-for nodes are added as nodes to be searched. Then, the path searching process terminates when there is a match between the searched-for node subsequently registered in "(d)" of FIG. 1 and the destination node G.

In the A* algorithm, the speed of the searching process may be increased if a cost such as a straight-line distance between a node to be searched and a destination node is added when the cost of reaching the node to be searched is calculated.

In Dijkstra's algorithm, if a departure node is far away from a destination node, there will be a lot of cases where the number of nodes to be searched before reaching the destination node becomes too large and the period of time required for the process becomes too long. In consideration of such a problem, a technique is known in which a path is searched for by classifying the roads into two or more levels depending on the type of road and by selecting one level according to the straight-line distance between a departure point and a destination point.

In this technique, for example, the road network composed of expressways and national roads is classified as the highest level, and the road network composed of expressways, national roads, and prefectural roads is classified as the next highest level lower than the highest level. The road network composed of the roads larger than or equal to municipal roads, including expressways, national roads, and prefectural roads, is moreover for example classified as the further next highest level, and all the roads are classified as the lowest level.

In the cases where the straight-line distance between a departure point and a destination point is short, the lowest level as a detailed road network is adopted to search for a path where all the roads are to be considered for travel.

By contrast, in the cases where the straight-line distance is long, the lowest-level road network is firstly adopted to search for a path from a departure point to a tentative departure point on a higher-level road network, and in a similar manner, a path from a destination point to a tentative destination point on a higher-level road network is searched for. Then, a path connecting the tentative departure point and the tentative destination point is searched for on the higher-level road network. As described above, the number of nodes to be searched may be reduced by searching a road network of a level that is suitable for the distance between a departure point and a destination point, and thus the period of time required for the searching process may be reduced. Moreover, incases of long-distance travel, it becomes possible to obtain a path that meets the demand of a general user by searching for a path in which priority is given to wide roads such as national roads instead of minor streets.

Patent Document 1: Japanese Laid-open Patent Publication No. 06-052237

Non-patent Document 1: E. W. Dijkstra, "A Note on Two Problems In Connexion with Graphs", Numerische Mathematik 1, pp. 269-271, 1959.

Non-patent Document 2: P. E. Hart, N. J. Nilsson, B. Raphael, "A Formal Basis for the Heuristic Determination of Minimum Cost Paths", IEEE Transactions of Systems Science and Cybernetics, Vol. SSC-4, No. 2, pp. 100-107, 1968.

SUMMARY

According to an aspect of the embodiments, a path searching method performed by a computer uses information expressed by a plurality of nodes and a plurality of links, where each of the links connects two nodes from the plurality of nodes and a cost is set to each of the links. Then, the path searching method performs, by using a processor, a path search from a first node to a second node among the plurality of nodes.

At that time, the path searching method searches for one node by a first search method from a plurality of nodes to be searched, where the nodes to be searched have not yet been searched for and are adjacent to a node that is recorded as an already-searched-for node among the plurality of nodes. Then, the present path searching method records a distance between the node searched for in the searching process and the second node is recorded, and records the node searched for as the already searched-for node.

Next, the path searching method changes, by using the processor, the first search method to a second search method in which a number of nodes to be searched is prevented from increasing according to distances between the second node and two or more nodes recorded as the already-searched-for node obtained as a result of performing the searching process and the recording process two or more times. Then, the path searching method generates, by using the processor, path information according to a node searched for by the second search method.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a path searching process where Dijkstra's algorithm is used.
FIG. 3 illustrates the node information of a map information database.
FIG. 4 illustrates the link information of a map information database.
FIG. 5 illustrates the information in a traffic information database.
FIG. 7 is a flowchart of the first path searching process.
FIG. 9 illustrates the data stored in a storage unit.
FIG. 10 depicts groups of road networks.
FIG. 11 depicts the thresholds of distance average values.
FIGS. 12A and 12B are a flowchart of the second path searching process.
FIG. 13 illustrates searched-for node information.
FIG. 14 is a diagram (1) illustrating the path searching process in which an alternative path is searched for.
FIG. 15 is a diagram (2) illustrating the path searching process in which an alternative path is searched for.
FIG. 16 is a diagram (3) illustrating the path searching process in which an alternative path is searched for.
FIG. 17 is a diagram (1) illustrating the relationship between the number of searches and the distance average value.
FIG. 18 is a diagram (2) illustrating the relationship between the number of searches and the distance average value.
FIGS. 19A and 19B are a flowchart of the third path searching process.
FIG. 20 depicts the thresholds of the minimum distance value.

DESCRIPTION OF EMBODIMENTS

Depending on the positional relationship between a departure point and a destination point, there are some cases in which the straight-line distance is short but a straight path does not exist due to an obstruction such as a bay, a lake, or a mountain being located between the departure point and the destination point, and thus it is desired to search for a path that bypasses the obstruction. The present inventors have noticed that in such cases, the travel distance of an actually travelable alternative path is far different from the straight-line distance between a departure point and a destination point.

However, in the above-mentioned conventional method where a path is searched for upon classifying the roads into two or more levels, the road network is selected according to the straight-line distance between the departure point and the destination point. For this reason, even though it is actually desired to search for an alternative path having a long distance, a search is performed using a detailed road network for a short distance, and this may become a factor in lengthening the processing time.

Note that such a problem is also present when path searching algorithms other than Dijkstra's algorithm and the A* algorithm are used.

Some embodiments will be described below in detail with reference to the accompanying drawings.

Figure 2:
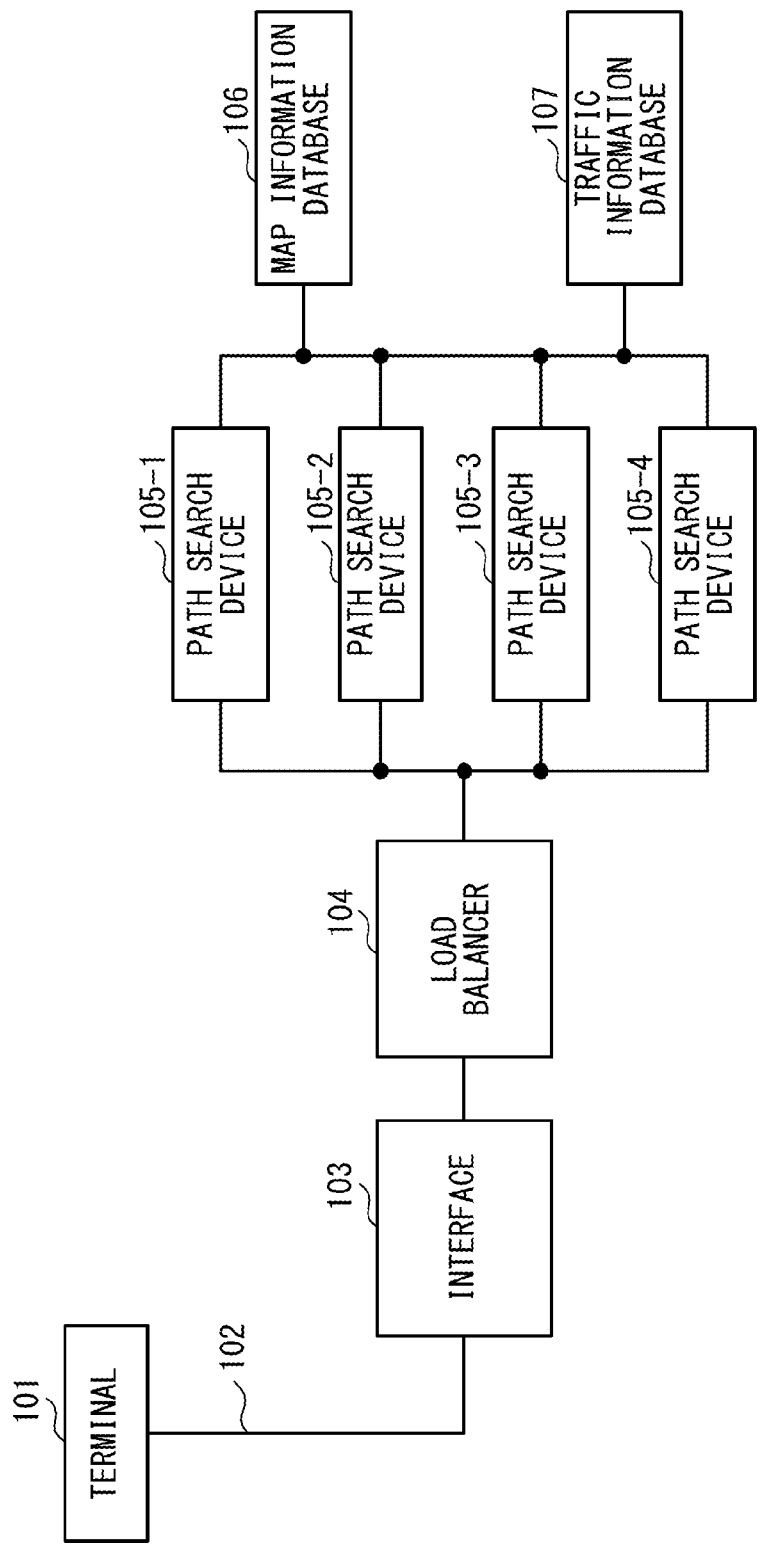
FIG. 2 is a block diagram of a path search system.

FIG. 2 illustrates an example of the configuration of a path search system including two or more path search devices. The path search system of FIG. 2 includes an interface 103, a load balancer 104, path search devices 105-1 to 105-4, a map information database 106, and a traffic information database 107.

The terminal 101 is an information processing apparatus such as a server, a personal computer, a mobile terminal, or a vehicle-mounted navigation device of a user, and the terminal 101 accesses the interface 103 via a wired or wireless communication network 102. The terminal 101 transmits to the interface 103 a path search request that includes the information about two points to set an area in which a path is to be searched for. Here, these two points may be, for example, a departure point and a destination point. As the information about the two points, for example, the latitude/longitude information of each point may be used.

The interface 103 is an information processing apparatus that receives a path search request, and the interface 103 transfers the received path search request to the load balancer 104. At this stage, the interface 103 may perform an authentication process or the like for a user who operates the terminal 101.

The load balancer 104 is an information processing apparatus that distributes two or more path search requests, and the load balancer 104 transmits the path search request transferred from the interface 103 to one of the path search devices 105-1 to 105-4 according to a specified load balancing algorithm.

The map information database 106 is a storage device in which the map information including the road information of two or more roads is stored. The road information of the roads includes the positional information of two or more nodes included in the roads and the information of links between the nodes. As the information about nodes, the information that uniquely identifies the nodes, the positional information of the nodes, and the identification information of another node adjacent to a node via a link are associated with each other and stored as depicted in FIG. 3. As the information about links, the information that uniquely identifies the links, the type of road to which a link belongs, and the link length information are associated with each other and stored as depicted in FIG. 4. The information that uniquely identifies the links may be stored as the information of the nodes that indicate both ends of a link. It is assumed that the information stored in the map information database 106 is preliminarily stored before a system according to the present embodiment starts operating. Note that the information stored in the map information database 106 may be updated when the information of adjacent nodes is changed while the system is operating.

The traffic information database 107 is a storage device in which the travel time information on each link is stored. Even if the lengths of links are the same, the travel time may be set as a cost that varies depending on conditions such as the type of road to which a link belongs, the positions of the links, the date and time of the movement on the links, or the like. In an example of FIG. 5, values related to the cost, which are set to links in association with the information of the nodes at both ends of a link for identifying the links, are stored upon being associated with the date and time information. The date and time information may be composed of any unit of time. An example in which the date and time information is stored as the information including a date in year/month/day format and a time is depicted in an example of FIG. 5, but the date and time information may only include a date, or may include a day of the week, certain time periods, or the like. It is assumed that the information stored in the traffic information database 107 is preliminarily stored before a system according to the present embodiment starts operating. Note that the information stored in the traffic information database 107 may be updated when the travel time information is changed while the system is operating.

The link length and travel time information of each link included in the map information database 106 and the traffic information database 107 are used as cost information in a path search. The information stored in the map information database 106 and the traffic information database 107 may be stored in one table in a collective manner, or may be distributed and stored in two or more tables that are associated with each other.

Each of the path search devices 105-1 to 105-4 is an information processing apparatus that performs a path searching process, and calculates a path from a departure node to a destination node according to the received path search request, the map information in the map information database 106, and the map information in the traffic information database 107. Then, each of the path search devices 105-1 to 105-4 creates path information that indicates the calculated path, and transmits the created path information to the load balancer 104. The path information is then transmitted to the terminal 101 through the interface 103 and the communication network 102.

The terminal 101 transmits the information used to display the path indicated by the received path information to another information processing unit, or displays the path on a screen.

Figure 6:
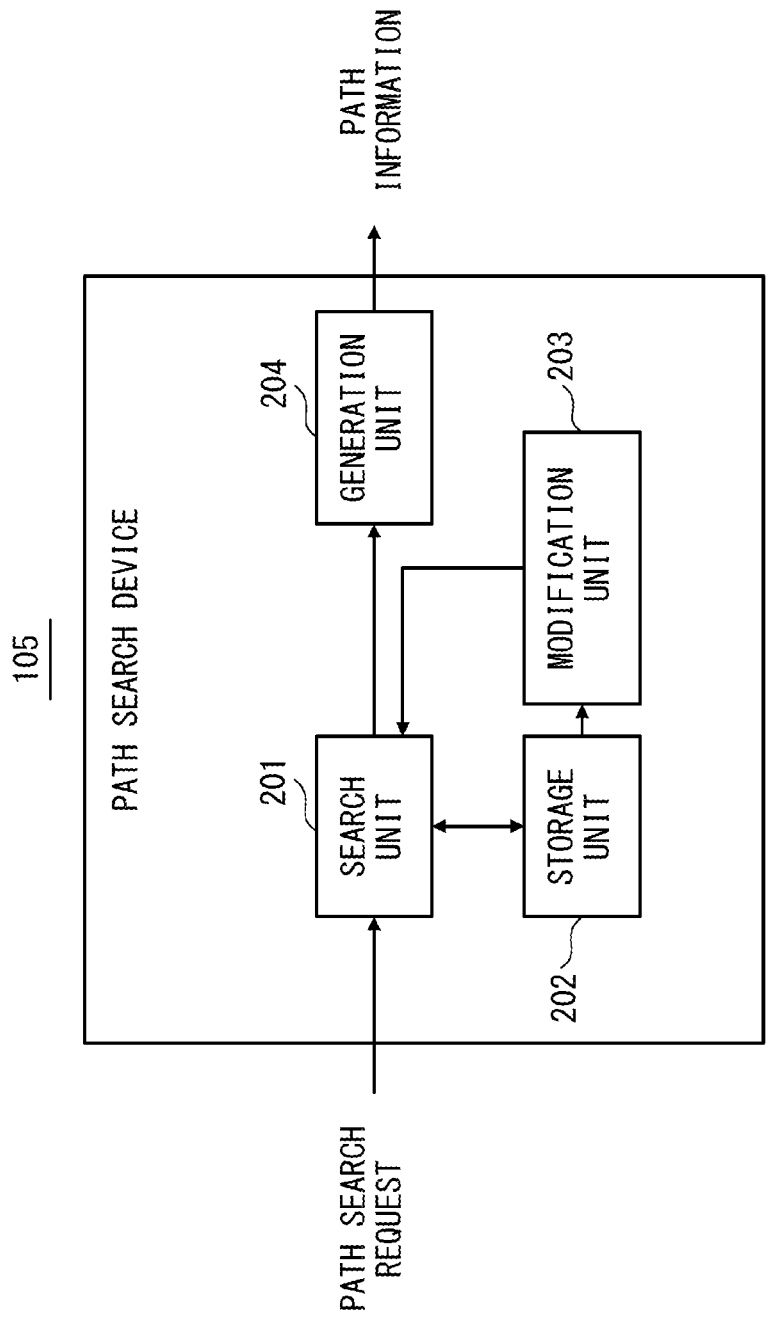
FIG. 6 is a functional block diagram of a path search device.

FIG. 6 illustrates an example of the functional configuration of the path search devices 105-1 to 105-4 of FIG. 2. The path search devices 105-1 to 105-4 of FIG. 2 have a similar functional configuration in common, and each of them corresponds to the path search device 105 of FIG. 6. Hereinafter, any one of the path search devices 105-1 to 105-4 may just be referred to as the path search device 105. The path search device 105 of FIG. 6 includes a search unit 201, a storage unit 202, a modification unit 203, and a generation unit 204.

FIG. 7 is a flowchart illustrating the first example of the path searching process performed in a cooperative manner by the processing units in the path search device 105 of FIG. 6.

Firstly, in the path search from the first node to the second node specified by the path search request received from the terminal 101, the search unit 201 uses the first search method to search for one node from two or more nodes to be searched (step 301). For example, it may be assumed that the node corresponding to a departure point is the first node, and that the node corresponding to a destination point is the second node. In the following description, the first node and the second node may be referred to as the departure node and the destination node. In the process of searching for a path according to the present embodiment, it is needless to say that the two points are not necessarily the points from which a user of the terminal 101 actually departs or at which a user of the terminal 101 actually arrives as long as a path is searched for between the two points.

When the first search method is used to search for a node, a node with the lowest cost may be searched for.

Then, the distance between the searched-for node and the destination node is recorded in the storage unit 202 (step 302). As the distance, straight-line distance may be used.

The search unit 201 repeats the process of step 301 in which one node is searched for from two or more nodes to be searched and the process of step 302 until the search process reaches a specified state. When the searched-for node becomes identical to the destination node in step 301 before the search process reaches a specified state, the process shifts to step 304.

When the search process reaches a specified state in step 302, the modification unit 203 changes the first search method to the second search method in which the number of nodes to be searched is prevented from increasing according to the distances between the two or more searched-for nodes and the destination node (step 303). For example, when an average value of the distances between the two or more searched-for nodes and the destination node is compared with a specified threshold and the average value of the distance is greater than the threshold, the first search method may be changed to the second search method.

Once the search method is changed, the search unit 201 uses the changed search method to repeat the process of step 301 in which one node is searched for from two or more nodes to be searched and the process of step 302.

Then, the generation unit 204 generates path information according to the searched-for node when the searched-for node becomes identical with the destination node (step 304). The generated path information includes the information of the nodes and links that indicate the path from a departure node to a destination node.

According to such a path search system, it becomes possible to prevent the period of time required for the process of searching for a path from being long when the actual distance on the path from a departure point to a destination point is significantly different from the distance between the departure point and the destination point.

The path search system of FIG. 2 includes one terminal 101, but two or more terminals may be included in a path search system according to the present embodiment. Moreover, the path search system of FIG. 2 includes four path search devices 105-1 to 105-4, but the number of the path search devices included in a path search system according to the present embodiment may be equal to or less than three, or may be equal to or greater than five. In actuality, the number of path search devices is determined according to the load to the system. It is not necessary to include the load balancer 104 in the system when the number of the path search devices 105 is just one. It is also possible for the interface 103 to not be included in the system and for the path search device 105 to directly receive the data from the terminal 101.

Instead of implementing the path search devices 105-1 to 105-4 as independent information processing apparatuses, the path search devices 105-1 to 105-4 may be implemented as two or more virtual machines that operate in one information processing apparatus. Alternatively, the path search devices 105-1 to 105-4 may be implemented as two or more virtual machines that are provided on two or more different information processing apparatuses in a distributed manner. Two or more path search requests may be processed by the batch processing instead of being processed in real time in a respective manner.

Figure 8:
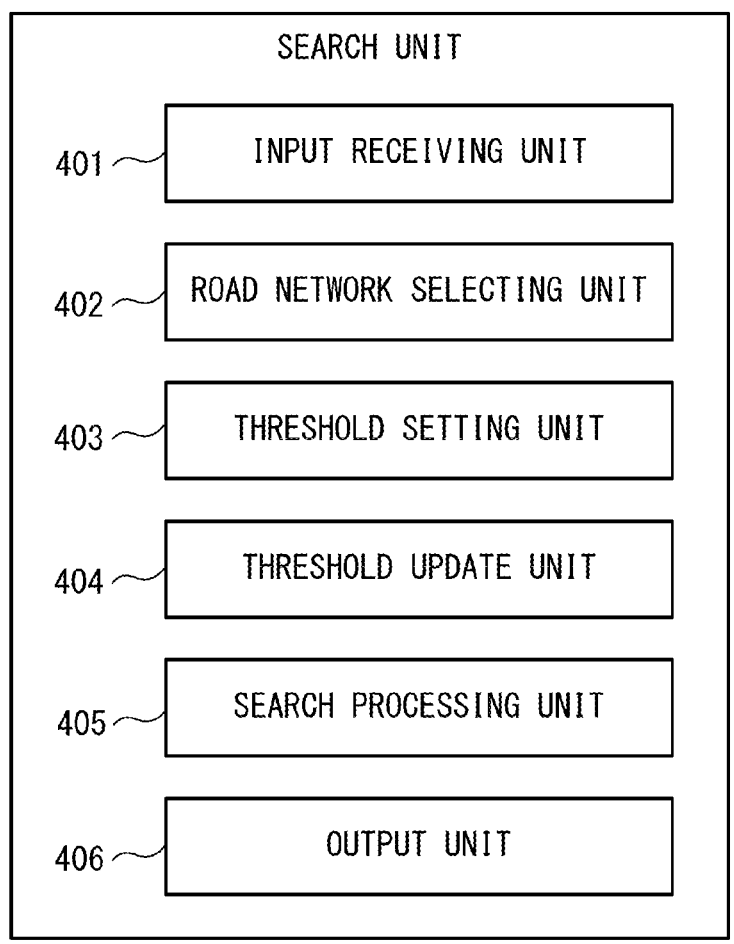
FIG. 8 is a functional block diagram of a search unit.

FIG. 8 illustrates an example of the functional configuration of the search unit 201 of FIG. 6. The search unit 201 of FIG. 8 includes an input receiving unit 401, a road network selecting unit 402, a threshold setting unit 403, a threshold update unit 404, a search processing unit 405, and an output unit 406.

FIG. 9 illustrates an example of the data that is stored in the storage unit 202 of FIG. 6. The storage unit 202 of FIG. 9 stores nodes-to-be-searched information 501, searched-for node information 502, and a search parameter 503 therein.

The nodes-to-be-searched information 501 includes the information of one or more nodes to be searched by the search unit 201, which is read from the road information stored in the map information database 106. The searched-for node information 502 includes the searched-for node and the total cost required for reaching the searched-for node, and the information of the previously-passed-through nodes that are passed before reaching the searched-for node. The search parameter 503 includes a threshold of a distance average value, a parameter that defines the decrement of the threshold, a search counter that indicates the number of searches, and a threshold of the number of searches.

The threshold of the distance average value is used to determine whether or not the road network to be searched should be changed in the path searching process, and is dynamically changed in the path searching process. An initial value of the threshold of the distance average value is supposed to be greater than the straight-line distance between a departure node and a destination node.

The path search device 105 performs a path searching process by using the road information to which two or more groups that correspond to two or more road networks whose level of detail is different from each other are set. The information of which type of road is associated with which group, i.e., the information of the groups of road networks, is stored in the search parameter 503 as a kind of search parameter. FIG. 10 depicts an example of the data table related to groups of road networks, where the groups and the type of road are associated with each other and stored.

Group 1 corresponds to the road network composed of all the roads including, for example, expressways, national roads, prefectural roads, and the other local streets and roads, and group 2 corresponds to the road network composed of, for example, expressways, national roads, and prefectural roads. Group 3 corresponds to the road network composed of expressways and national roads. Supposing that, for example, group 1 is the lowest level and group 3 is the highest level, when an average value of the distances between the searched-for nodes and the destination node is greater than a threshold, the number of nodes to be searched is prevented from being increased by changing the search method to a search method in which a path search is performed according to a road network of a higher level.

FIG. 11 depicts an example of the initial values set as thresholds of distance average values in the search parameter 503. A table for setting a threshold as depicted in FIG. 11 is also stored in the storage unit 202. In this example, the above-described groups 1-3 of three road networks are defined according to a range scale in which the distance D between the departure node and the destination node is involved, and thresholds T1 and T2 are set to groups 1 and 2, respectively.

The road network of group 2 or group 3 has a smaller number of nodes and links than the road network of group 1, and thus the road network of group 2 or group 3 may be expressed as "rough" in comparison with the road network of group 1. Moreover, the road network of group 3 has a smaller number of nodes and links than the road network of group 2, and thus the road network of group 3 may be expressed as "rough" in comparison with the road network of group 2. Regarding group 3, a threshold is not set thereto because there is no group of road network that is rougher than group 3. The types of roads that correspond to varying range scales are as follows.

(1) Short distance
Range scale: D is equal to or smaller than D1
Group 1: All the roads
Threshold of distance average: T1
(2) Medium distance
Range scale: D is greater than D1 and equal to or smaller than D2
Group 2: Expressways, national roads, and prefectural roads
Threshold of distance average: T2
(3) Long distance
Range scale: D is greater than D2
Group 3: Expressways and national roads As values that delimit the range scale, a value in the range, for example, between 3000 m-10 km is used for D1, and a value in the range, for example, between 30 km-100 km is used for D2. In the example of FIG. 11, the range scale is divided into three, but the range scale may be divided into two, four, or more than four. The thresholds T1 and T2 are set, for example, to values equal to or greater than D1 and D2, respectively.

Note that an initial threshold is not necessarily set for every group of road networks, but may be determined by multiplying the distance between the departure node and the destination node by a specified coefficient.

When a distance average value between the searched-for nodes and the destination node is equal to or smaller than a threshold, the threshold is updated by subtracting from the threshold a specified decrement which is stored as a parameter that defines the decrement of a threshold in the search parameter 503. The decrement of a threshold may be a fixed value, or a result of multiplying an initial threshold or current threshold by a certain ratio. In the case of the latter, the multiplication result or a certain ratio is set as the parameter that defines the decrement of a threshold. A certain ratio may be, for example, 10%, 20%, or the like.

Figure 12A:
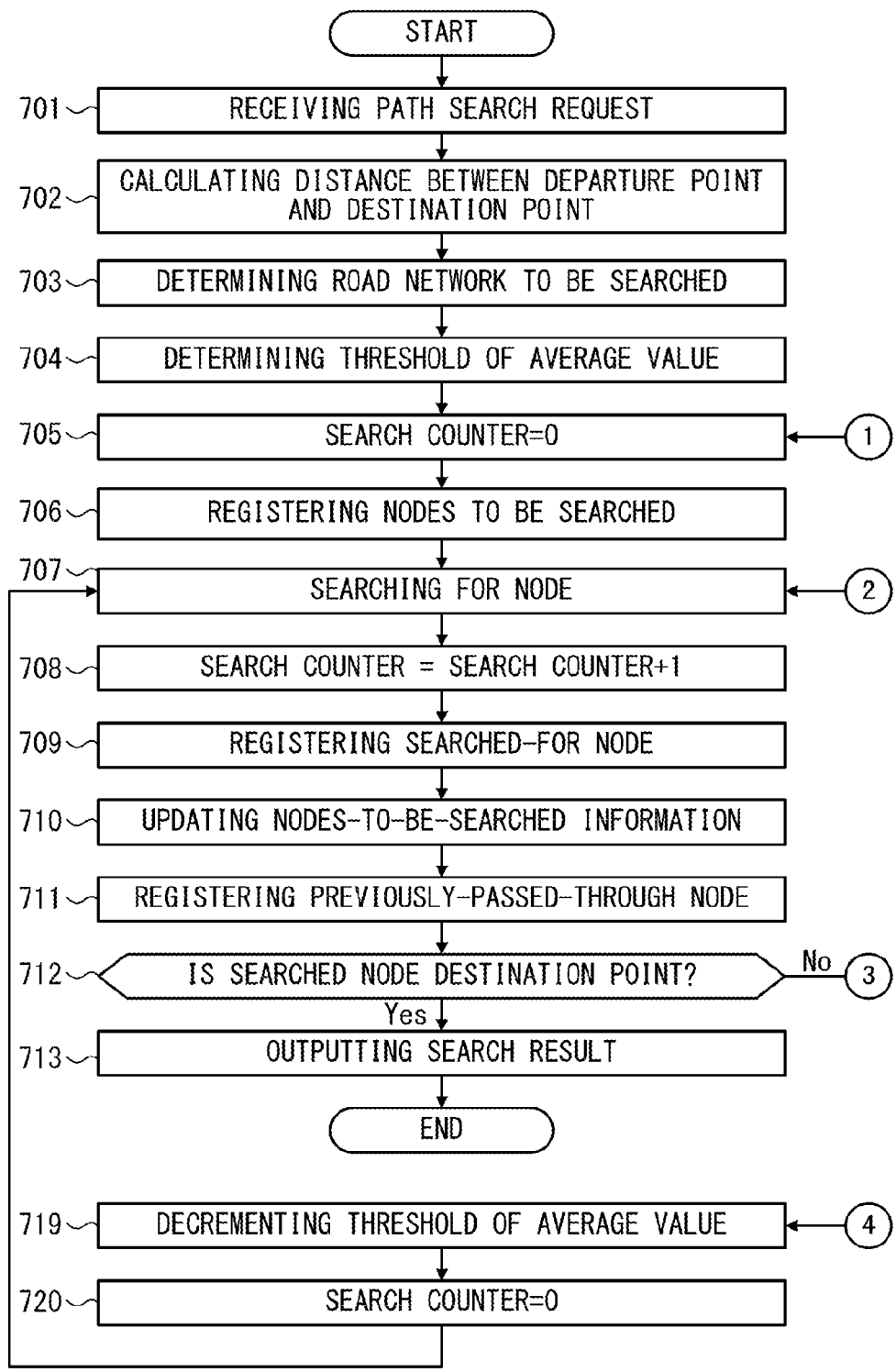

FIGS. 12A and 12B are a flowchart illustrating the second example of the path searching process performed by the path search device 105 of FIG. 6. Firstly, the input receiving unit 401 of the search unit 201 receives a path search request from the terminal 101. Then, the input receiving unit 401 generates a departure node that corresponds to the latitude/longitude of a departure point as well as a destination node that corresponds to the latitude/longitude of a destination point in addition to a node in the road information stored in the map information database 106 according to the path search request received from the terminal 101 (step 701).

Next, the road network selecting unit 402 calculates the distance between the departure node and the destination node according to the departure node and destination node information (step 702), and determines the road network to be searched according to the calculated distance (step 703). As mentioned above with respect to the description of FIG. 7, a straight-line distance may be used as the distance.

The threshold setting unit 403 refers to the table for setting a threshold, which is stored in the storage unit 202 as illustrated in FIG. 11, according to the distance calculated in step 702. Then, the threshold setting unit 403 determines an initial value for the threshold of a distance average, and stores the determined initial value in the search parameter 503 of the storage unit 202 (step 704). Any one of step 703 and step 704 may be performed first.

Next, the search processing unit 405 sets a search counter included in the search parameter 503 to "0" (step 705). Then, one or more nodes adjacent to the departure node, which correspond to two or more nodes stored in the road information of the map information database 106 illustrated in FIGS. 3 and 4, are registered with the nodes-to-be-searched information 501 (step 706). Next, a node that is reachable from the departure node at the lowest cost out of the registered nodes to be searched is searched with reference to the information in the traffic information database 107 illustrated in FIG. 5 (step 707), and the search counter is incremented by one (step 708). Then, the searched-for node is registered with the searched-for node information 502 (step 709). Note that in step 707, the node is searched for by using Dijkstra's algorithm or A* algorithm. The cost from the departure node may be calculated by adding the cost associated with the links between the searched-for nodes and adjacent nodes to the total cost which is recorded in association with the searched-for nodes.

Next, the search processing unit 405 excludes the node searched for in step 707, i.e., the node registered with the searched-for node information 502 in step 709, from the nodes-to-be-searched information 501, and adds one or more nodes adjacent to the searched-for node to the nodes-to-be-searched information 501 (step 710). Then, the search processing unit 405 registers the node that was passed through immediately before the searched-for node with the searched-for node information 502 as a previously-passed-through node, where the previously-passed-through node is associated with the searched-for node. Moreover, the search processing unit 405 registers the total cost required to reach the node searched for in step 707 from the departure node with the searched-for node information 502, where the total cost is associated with the searched-for node (step 711). Then, the search processing unit 405 checks whether or not the searched-for node is the destination node (step 712).

When the searched-for node is the destination node (step 712, "Yes"), the output unit 406 outputs the searched-for node information 502 to the generation unit 204 as a search result (step 713). Then, the generation unit 204 generates the path information that indicates the path from the departure node to the destination node by tracking back the previously-passed-through nodes included in the searched-for node information 502 in order from the destination node to the departure node, and outputs the generated path information. Note that the generation unit 204 converts the position of the nodes included in the path information into latitude/longitude information when outputting the path information.

When the searched-for node in step 707 is not the destination node (step 712, "No"), the search processing unit 405 calculates the distance between the searched-for node and the destination node and stores the calculated distance in the storage unit 202 (step 714). FIG. 13 depicts an example of the data that is stored in the storage unit 202 as the searched-for node information 502. A new record is generated in step 709, and the node searched for in step 707, i.e., the identifier of the searched-for node, is registered in the searched-for node column of the generated record. Then, the identifier of the previously-passed-through node is registered in the previously-passed-through node column of the record, and the total cost information is registered in the total cost column in step 711. Then, the distance calculated in step 714 is registered in the distance of the record column.

Next, the modification unit 203 compares the search counter with the threshold of the number of searches (step 715). When the value indicated by the search counter is smaller than the threshold (step 715, "No"), the search processing unit 405 repeats the processes of step 707 and the following steps. When the value indicated by the search counter reaches the threshold (step 715, "Yes"), the modification unit 203 calculates an average value of the distances from the recently searched-for nodes to the destination node, and compares the calculated average value with the thresholds of distance average value that are stored in the search parameter 503 in association with the current groups of road networks to be searched (step 716).

Here, the recently-searched-for nodes indicate two or more nodes searched for in a specified number of recent searches, and the recently-searched-for nodes include, for example, the latest searched-for node. For the specified number, a number equal to or smaller than the threshold of the number of searches is used. For example, when the threshold of the number of searches is five hundred, the specified number may be a hundred, where an average value of the distances to the destination node for the nodes searched for in the 401st to 500th searches may be used.

When the calculated average value is equal to or smaller than the threshold (step 716, "No"), the threshold update unit 404 of the search unit 201 decrements the threshold by the amount specified by a parameter (step 719). Then, the search processing unit 405 sets the search counter to "0" (step 720), and repeats the processes of step 707 and the following steps. Accordingly, the path search is continued by using the nodes-to-be-searched information 501 which is updated in step 710.

On the other hand, when the calculated average value is greater than the threshold (step 716, "Yes"), the modification unit 203 changes the road network to be searched to the group that is rougher by one level (step 717). Then, the threshold update unit 404 changes the threshold of a distance average value to the initial value that corresponds to the road network to be searched (step 718), and the search processing unit 405 initializes the information stored in the searched-for node information 502 and repeats the processes of step 705 and the following steps. Accordingly, the path search starts again from the departure node with the post-changed road network.

For example, when the road network of group 1 is selected in step 703, the threshold T1 is used in step 716. Then, once the road network to be searched is changed to group 2 in step 717, the threshold is changed to T2 in step 718.

When the calculated average value exceeds the threshold T2 in step 716 afterward, the road network to be searched is changed to group 3 in step 717. Note that no threshold is set to group 3, and thus the threshold is not changed in step 718. In the path search to be performed for the road network of group 3, it is assumed that the road network that composes the group 3 is set in advance such that the destination node will be reached in an acceptable processing time.

Figure 14:
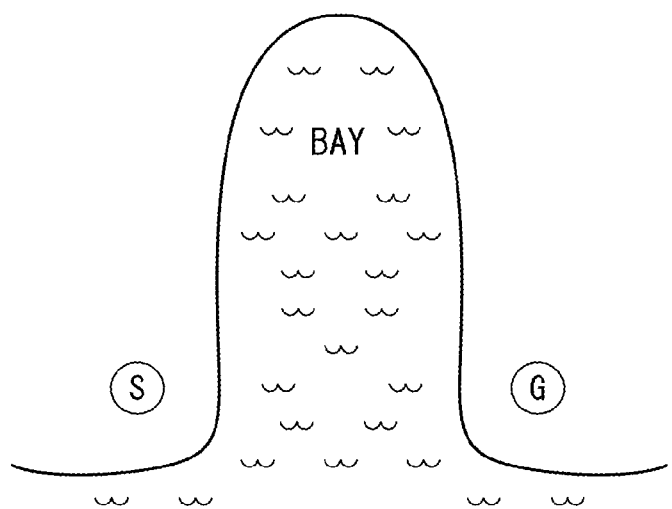
Figure 15:
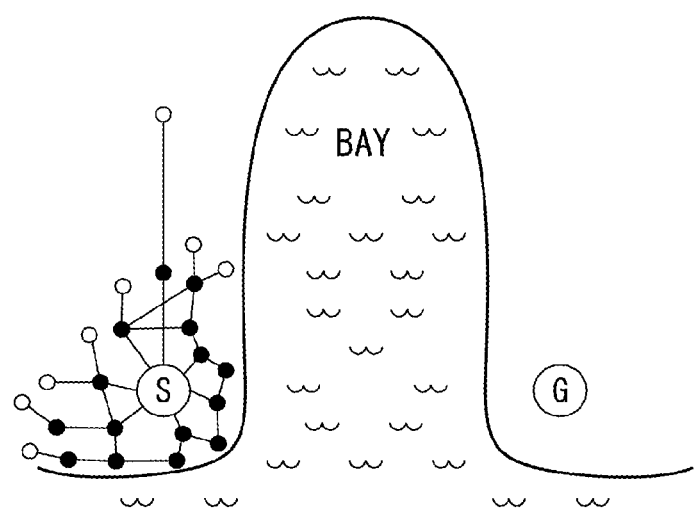

FIGS. 14 through 16 illustrate a path searching process of the case in which the destination node is located on the opposite bank of the departure node across a bay, as an example of the case in which the actual distance on the path from a departure point to a destination point is significantly different from the distance between the departure node and the destination node. FIGS. 17 and 18 illustrate the relationship between the number of searches and the distance average values in the above path searching process in graph form, where the vertical axis indicates the average value of distance and the horizontal axis indicates the number of searches. In this case, a path that bypasses a bay is searched for because there is no straight path that connects between a departure node S and a destination node G of FIG. 14.

In FIGS. 17 and 18, solid lines 1501 and 1502 and 1601 to 1606 indicate the thresholds of distance averages, and broken lines indicate the change in distance average value. Note that the number of searches N1 matches the threshold of the number of searches, and the interval of the number of searches N1-N6 also matches the threshold of the number of searches.

When the road network, for example, of group 1 is selected as the first search target, all the roads from the departure node S become targets from which nodes are searched, as illustrated in FIG. 15. Then, the processes of steps 707 through 715 are repeated, and when the search counter reaches the threshold N1 in step 715 as illustrated in FIG. 17, the distance average value is compared with a threshold 1501 (T1) in step 716. When the distance average value is smaller than the threshold 1501 at that time, the threshold 1501 is changed to a threshold 1502 that is smaller than T1 in step 719.

When the number of searches reaches N2, the value of the search counter indicates the threshold N1 again and the distance average value is compared with the changed threshold 1502. When the distance average value is greater than the threshold 1502, the road network to be searched is changed to group 2 in step 717.

Next, nodes are searched from group 2 composed of expressways, national roads, and prefectural roads, as illustrated in FIG. 16. When the search counter reaches the threshold N1 in step 715, the distance average value is compared with a threshold 1601 (i.e., T2) in step 716, as illustrated in FIG. 18. When the distance average value is smaller than the threshold 1601 at this time, the threshold 1601 is changed to a threshold 1602 that is smaller than T2 in step 719.

When the number of searches reaches N2 from the first search, i.e., when the number of searches performed reaches N1 after the threshold 1601 was changed to the threshold 1602, the search counter indicates the threshold N1 again, and the distance average value is compared with the changed threshold 1602. When the distance average value is smaller than the threshold 1602 at this time, the threshold 1602 is changed to a smaller threshold 1603 in step 719.

In a similar manner, when the number of searches reaches N3-N5, the thresholds of distance average values are changed to smaller thresholds 1604-1606, respectively, and the path searching process terminates when the searched-for node coincides with the destination node G.

When nodes in the roads that do not belong to group 1 are to be searched, including the cases after the road group to be searched is switched, the above-mentioned conventional search method may be used. In other words, the search process is performed, from a departure node to a destination node, for nodes that belong to more detailed roads than the ones in the group to be searched until a node is reached that belongs to the roads in the group to be searched. Once a node of the roads in the group to be searched is reached after the search process is repeated, the search process is performed for nodes of more detailed roads than the ones in the group to be searched from the destination node to the departure node.

Once a node of the roads in the group to be searched is reached as the search process is repeated from the destination node, a connecting path is searched for between a node on the roads in the group to be searched which is found in the search from the departure node and a node on the roads in the group to be searched which is found in the search from the destination node, where only the nodes that belong to the roads in the group to be searched are considered. When the path is searched for, the path searching process terminates.

As described above, the path search device 105 checks whether or not the searched-for node is moving in the direction approaching the destination node with reference to the departure node at the timing when the searching of nodes is repeated two or more times. If the actual distance on the path from the departure node to the destination node is not significantly different from the distance between the departure node and the destination node, the distance between the searched-for node and the destination node should become shorter than the distance between the departure node and the destination node. In other words, it is considered that the search is being performed in the direction from the departure node to the destination node.

When the distance between the searched-for node and the destination node is not getting shorter than the distance between the departure node and the destination node, it is considered that a situation is indicated in which the search is not being performed in the direction approaching the destination node. Such a situation may be, for example, the case in which an obstruction such as a bay, a lake, or a mountain exists between the departure node and the destination node and no link or node exists in the area of the obstruction. When such a state of the search process is detected by the path search device 105 in step 716, the search process is shifted to a search method in which the number of nodes to be searched becomes smaller.

When the distance average value exceeds the threshold, the path search device 105 changes the search method to a search method in which a rougher road network is used. The change in the search target to a rough road network is equivalent to the reduction in the number of nodes or links to be searched. Accordingly, the increase in the number of nodes to be searched may be controlled even if a path is searched for that bypasses an obstruction such as a bay, a lake, or a mountain located between the departure node and the destination node. As a result, the processing time is prevented from being longer. It also becomes possible to search in long-distance travel for a travel path in which priority is given to wide roads such as national roads rather than minor streets.

Further, the path search device 105 may quickly detect a tendency for the distance average value to increase as the number of searches increases by changing the threshold to a smaller threshold when the distance average value is equal to or smaller than a threshold, and may change the road network to be searched at an earlier stage.

The road network to be searched is changed to the group that is rougher by one degree in step 717 of FIG. 12, but the road network to be searched may be changed to the group that corresponds to the calculated distance average value. When the distance average value is, for example, greater than D1 and equal to or smaller than D2, group 2 is selected as the road network to be searched. Moreover, when the distance average value is, for example, greater than D2, group 3 is selected as the road network to be searched. Accordingly, it becomes to possible to select an optimal road network according to a recent distance average value, and the processing time may be shortened compared to when the road network is switched in a step-by-step manner.

Figure 19B:
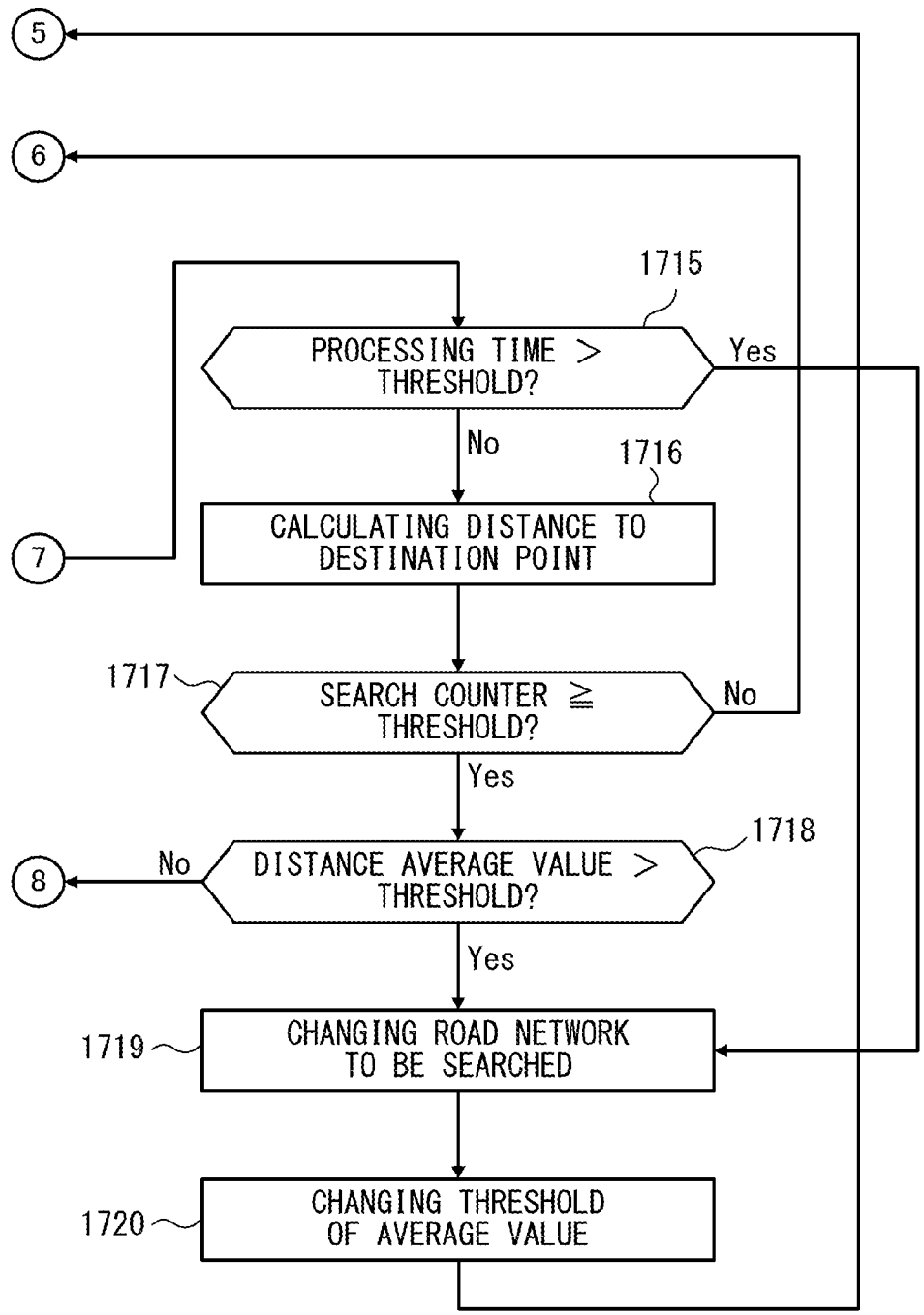

FIGS. 19A and 19B are a flowchart illustrating the third example of the path searching process performed by the path search device 105. The processes in steps 1701, 1703 to 1714, and 1716 to 1722 of FIG. 19 are similar to the processes in steps 701 to 720 of FIG. 12. In this process, the search parameter 503 of FIG. 9 includes a threshold of the processing time.

Once a path search request is received from the terminal 101, the search processing unit 405 of the search unit 201 starts measuring the processing time (step 1702). When the searched-for node is not the destination node in step 1713 (step 1713, "No"), the modification unit 203 compares the processing time so far with a threshold of the processing time (step 1715). Such a comparison is not necessarily performed every time the searched-for node is determined, but may be performed every time a certain number of searched-for nodes are determined.

When the processing time is equal to or smaller than a threshold (step 1715, "No"), the modification unit 203 performs the processes of step 1716 and the following steps. When the processing time is greater than a threshold (step 1715, "Yes"), the road network to be searched is immediately changed (step 1719).

As described above, by performing the processes depicted in the flowchart of FIGS. 19A and 19B, the path search device 105 forces a change in the road network to be searched at the time when a certain period of time has passed after the process has started. Accordingly, the path search device 105 may switch the search method to a faster search method even if the distance average value does not exceed a threshold. For example, it becomes possible to force the switching of the search method to a search method in which a rougher road network is targeted when a path search in which minor streets are targeted has been performed for too long a time.

Here, it is not efficient to change the road network to be searched and start a new search from the departure node, in spite of the fact that the recently-searched-for nodes are getting closer in the direction from the departure node to the destination node. For this reason, a method may be adopted in which the minimum value of the distance from each of the recently-searched-for nodes to the destination node is calculated, and when the calculated minimum value is equal to or smaller than a specified value, the road network to be searched is not changed even if the distance average value is greater than a threshold.

FIG. 20 illustrates an example of the thresholds of the minimum distance value. The thresholds of the minimum distance value may be stored in the storage unit 202 as a kind of the search parameter 503 in a similar manner to the thresholds of the distance average value. In this example, groups 1-3 of three road networks are defined according to a range scale in which the distance D between the departure node and the destination node is involved, and thresholds M1-M3 are set to the groups 1-3, respectively. For example, the threshold M1 is set to a value smaller than the threshold T1 of the distance average value, and the threshold M2 is set to a value smaller than the threshold T2 of the distance average value.

Figure 21A:
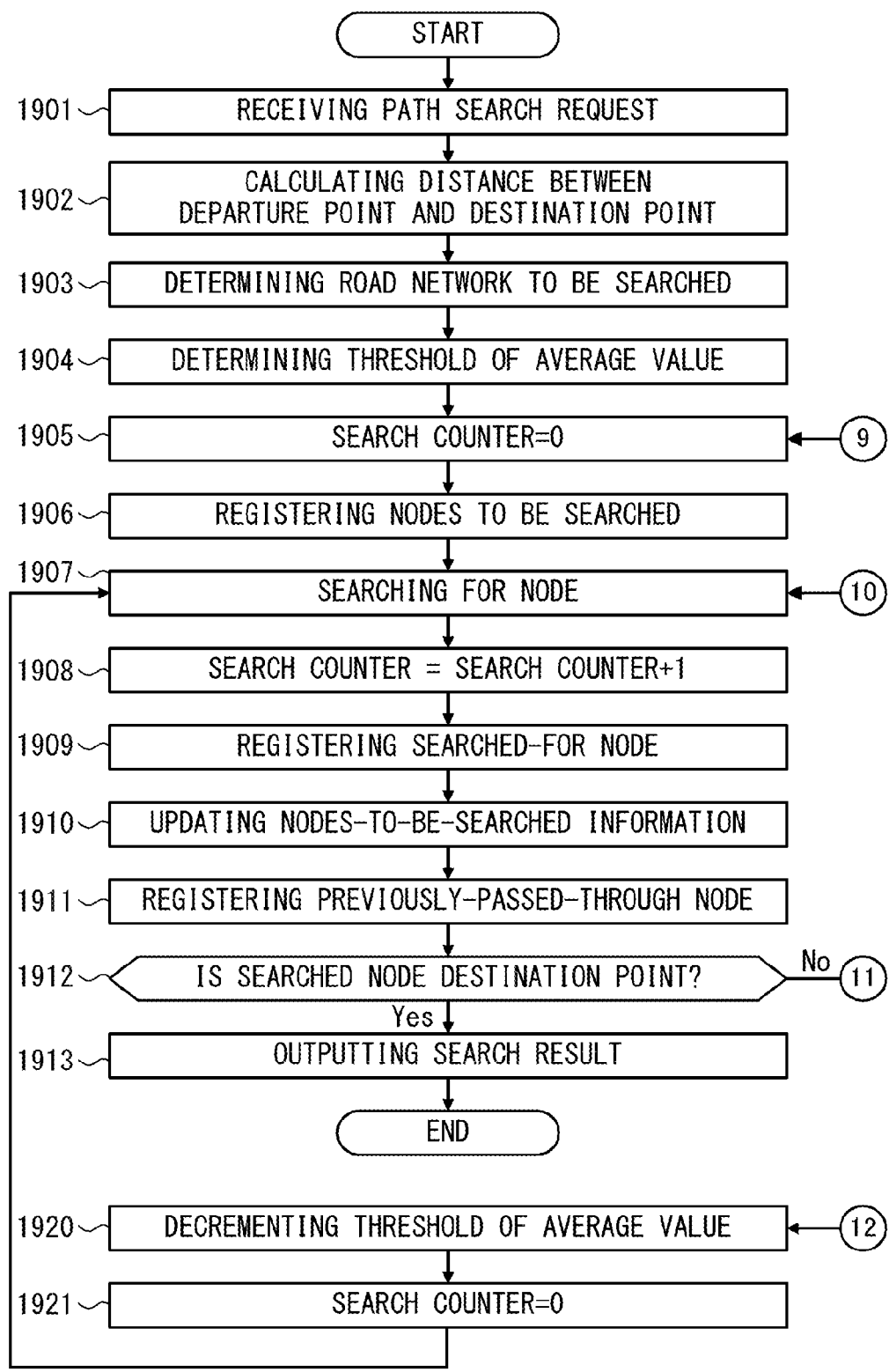
FIGS. 21A and 21B are a flowchart of the fourth path searching process.
Figure 21B:
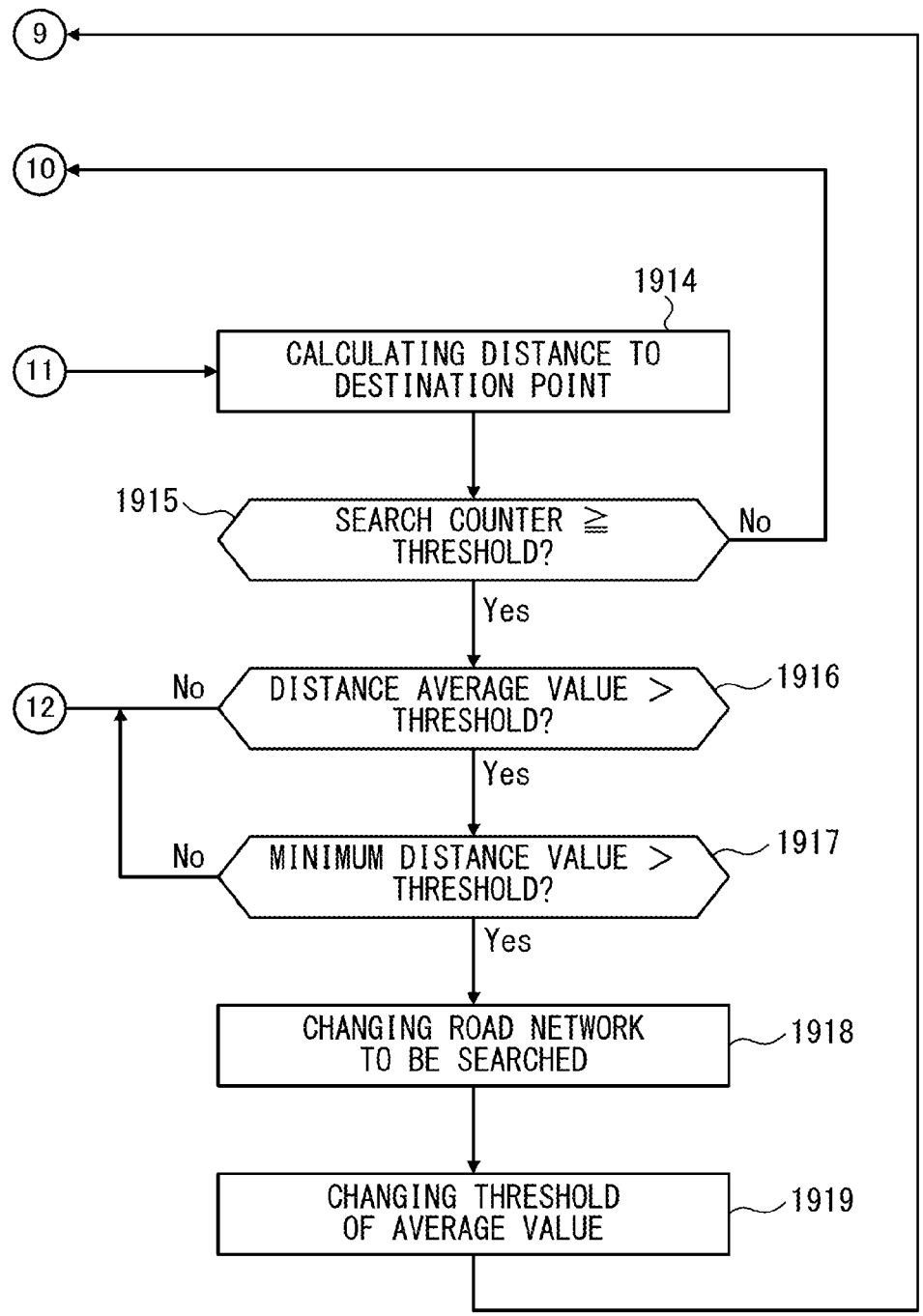

FIGS. 21A and 21B are a flowchart illustrating the fourth example of such a path searching process. The processes in steps 1901 to 1916 and 1918 to 1921 of FIG. 21 are similar to the processes in steps 701 to 720 of FIG. 12. In this process, the search parameter 503 of FIG. 9 includes the thresholds of the minimum distance value.

When the distance average is greater than the threshold in step 1916 (step 1916, "Yes"), the modification unit 203 calculates the minimum value of the distances from the recently-searched-for nodes to the destination node. Then, the modification unit 203 compares the calculated minimum value with the threshold of the minimum distance value (step 1917).

When the minimum value is equal to or smaller than the threshold (step 1917, "No"), the modification unit 203 does not change the road network to be searched, and the search unit 201 performs the processes of step 1920 and the following steps. On the other hand, when the minimum value is greater than the threshold (step 1917, "Yes"), the modification unit 203 changes the road network to be searched (step 1918).

As described above, when the minimum distance value is equal to or smaller than a threshold, the road network to be searched is not changed even if the distance average value is greater than the threshold. By so doing, the repeated process of searching from the departure node is avoided, and the processing time may be prevented from being long.

Figure 22A:
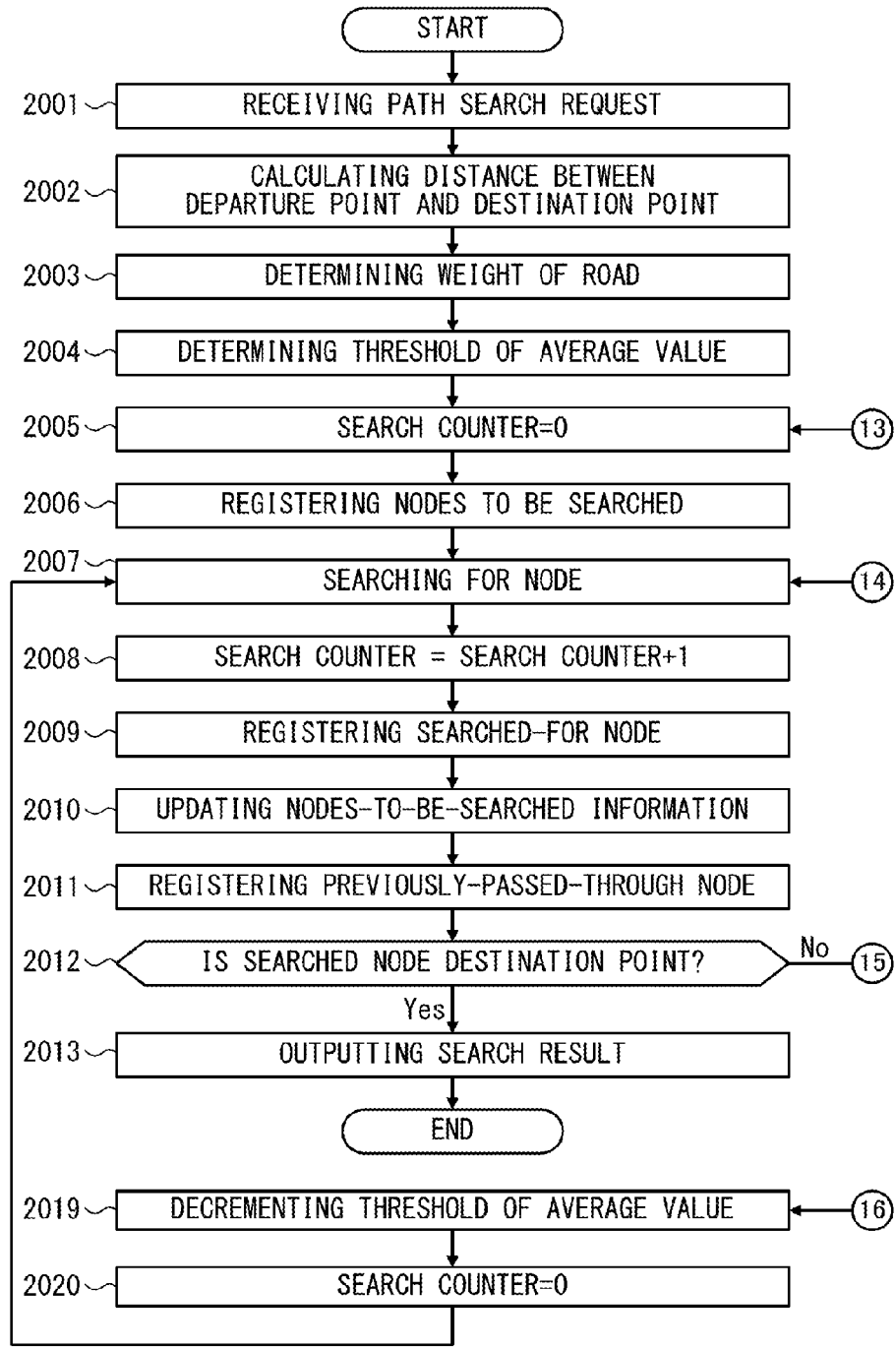
FIGS. 22A and 22B are a flowchart of the fifth path searching process.
Figure 22B:
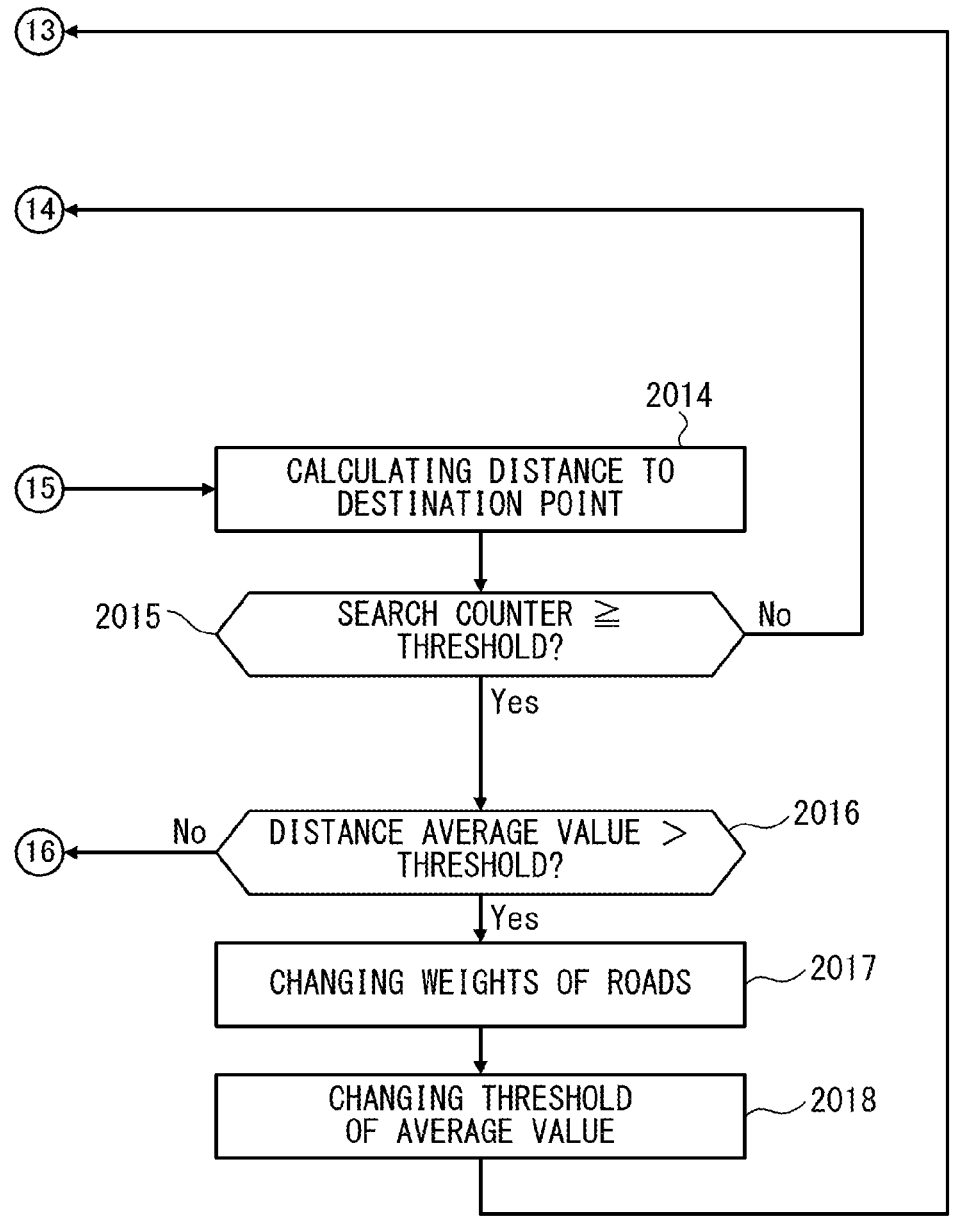

FIGS. 22A and 22B are a flowchart illustrating the fifth example of the path searching process. Apart from the above-described method in which nodes to be searched are switched, an alternative method may be adopted in which the values of cost to be assigned to road links are changed by the path search device 105 and thus the number of nodes to be searched is further reduced. The processes in 2001-2002, 2004-2016, and 2018-2020 of FIG. 22 are similar to the processes in steps 701-702, 704-716, and 718-720 of FIG. 12. In this process, the search parameter 503 of FIG. 9 includes the weight of each road to be multiplied by the cost of link. Note that the road network selecting unit 402 of FIG. 8 becomes unnecessary as all the roads are to be searched at all times.

The search processing unit 405 of the search unit 201 calculates the distance between the departure node and the destination node according to the departure node and destination node information included in the path search request (step 2002). Then, the weight of each road to be multiplied by the link cost is determined according to the calculated distance (step 2003).

For example, the same weight is assigned to all the roads when the distance is classified as a short distance, and greater weight than the weight assigned to expressways, national roads, and prefectural roads is assigned to local streets and roads excluding expressways, national roads, and prefectural roads when the distance is classified as a medium distance. When the distance is classified as a long distance, greater weight than the weight assigned to expressways and national roads is assigned to prefectural roads, and local streets and roads. As the cost relatively increases in the road links to which even greater weight is assigned, there will be a reduced possibility for such road links to be selected as a travel path when a node of the lowest cost is searched for.

When the distance average is greater than the threshold in step 2016 (step 2016, "Yes"), the modification unit 203 changes the weight of roads (step 2017). For example, when the distance between the departure node and the destination node is classified as a short distance, the weight of local streets and roads excluding expressways, national roads, and prefectural roads is changed to a value greater than that of expressways, national roads, and prefectural roads. When the distance is classified as a medium distance, the weight of prefectural roads, and local streets and roads, is changed to an even greater value.

As described above, as the method is changed to a search method in which the weight of narrow roads is increased, a path traveling broader roads is selected on a priority basis, and the increase in the nodes to be searched may be suppressed. Accordingly, the processing time may be prevented from being long.

Note that the flowcharts in FIGS. 12A and 12B, FIGS. 19A and 19B, FIGS. 21A and 21B, and FIGS. 22A and 22B are illustrated merely as an example, and some of the processes may be omitted or modified according to the configuration or condition of a path search system. For example, the comparison between the processing time and the threshold in step 1715 of FIG. 19B may be performed after step 1717. Also in the path searching process of FIGS. 21A and 21B and FIGS. 22A and 22B, in a similar manner to the path searching process of FIGS. 19A and 19B, it is possible to force a change in the search method when the processing time exceeds the threshold.

Moreover, in step 717 of FIG. 12B, the path searching algorithm may be changed instead of changing the road network to be searched. For example, by changing Dijkstra's algorithm to an A* algorithm, the increase in the number of nodes to be searched may be suppressed. Another method other than Dijkstra's algorithm or an A* algorithm may be adopted as a path searching algorithm. For example, algorithms such as the branch and bound, hill-climbing, and best-first search may be used. When it is preferred that the road network to be searched be changed, the search method may be changed to a search method in which the number of nodes to be searched is smaller than that of the previously run search method.

Alternatively, the roads may be classified according to attributes such as the length and width of the roads, and upper-limit traveling speed rather than classifying the roads according to the type of road. The number of groups of road networks that is set in accordance with the distance between the departure node and the destination node may be two, or four or more.

Figure 23:
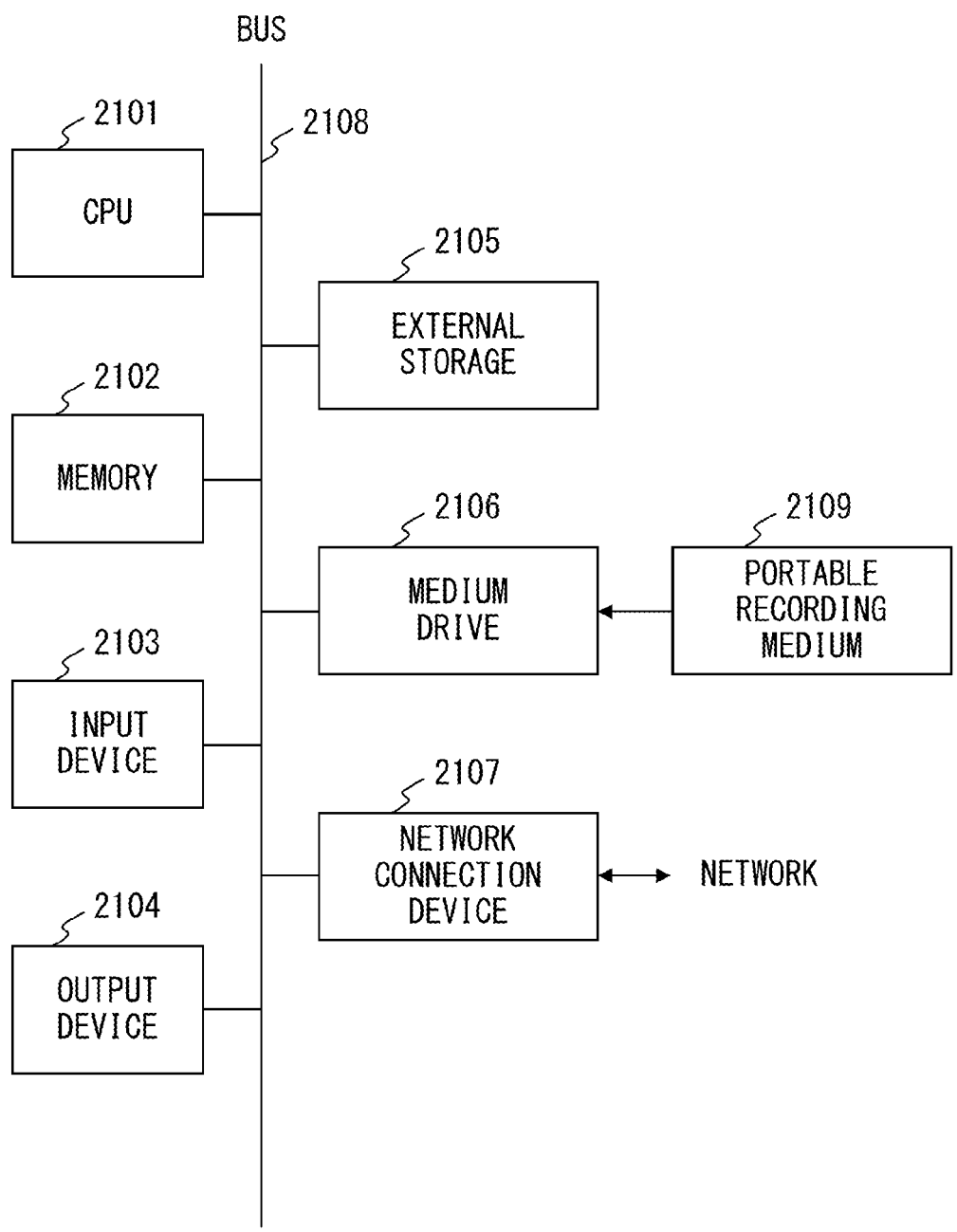
FIG. 23 is a block diagram of an information processing apparatus.

The terminal 101, the interface 103, the load balancer 104, the path search devices 105-1 to 105-4, the map information database 106, and the traffic information database 107 of FIG. 2 may be realized, for example, by using an information processing apparatus (computer) as depicted in FIG. 23.

The information processing apparatus of FIG. 23 is provided with a central processing unit (CPU) 2101, a memory 2102, an input device 2103, an output device 2104, an external storage 2105, a medium drive 2106, and a network connection device 2107. These elements are connected with each other through a bus 2108.

The memory 2102 is, for example, a semiconductor memory such as a read-only memory (ROM), a random access memory (RAM), or a flash memory, and the memory 2102 stores the program and data that is used in the processing. For example, the CPU 2101 (processor) may use the memory 2102 to execute a program, thereby performing the processes of the terminal 101, the interface 103, the load balancer 104, and the path search devices 105-1 to 105-4. When the processes of the path search devices 105-1 to 105-4 are performed, the CPU 2101 operates virtually as processing units (i.e., the search unit 201, the modification unit 203, the generation unit 204, and the units 401 to 406 in the search unit 201) by executing a program.

When the information processing apparatus is used as one of the path search devices 105-1 to 105-4, the memory 2102 may be used as the storage unit 202 of FIG. 6, and may also store the map information and the traffic information.

The input device 2103 is, for example, a keyboard, a pointing device, or the like, and is used by a user or operator for giving instructions or inputting information. The output device 2104 is, for example, a display device, a printer, a speaker, or the like, and is used by a user or operator for making inquiries or outputting a processing result. The processing result at the terminal 101 includes a screen on which a path indicated by the path information is displayed.

The external storage 2105 may be, for example, a magnetic disk device, an optical disk device, a magneto-optic disk device, or a tape device. The external storage 2105 includes a hard disk drive. The information processing apparatus may store programs and data in the external storage 2105, and may use the stored programs and data by loading them into the memory 2102.

When the information processing apparatus is used as the map information database 106 or the traffic information database 107, the external storage 2105 stores the map information or traffic information.

The medium drive 2106 drives the portable recording medium 2109 to access the recorded contents. The portable recording medium 2109 may be a memory device, a flexible disk, an optical disk, a magneto-optic disk, or the like. The portable recording medium 2109 may include a compact disc read-only memory (CD-ROM), a digital versatile disc (DVD), a universal serial bus (USB) memory, or the like. A user or operator may store programs and data in the portable recording medium 2109, and may use the stored programs and data by loading them into the memory 2102.

As described above, a computer-readable recording medium in which a program used for various processes and data are stored may include a physical (non-transitory) recording medium such as the memory 2102, the external storage 2105, and the portable recording medium 2109.

The network connection device 2107 is a communication interface that is connected to a communication network such as the Local Area Network (LAN), the Internet, or the like, and that performs data conversion involved in the communication. The information processing apparatus may receive a program and data from an external device through the network connection device 2107, and may use the received program or data by loading it into the memory 2102.

It is not necessary for the information processing apparatus to include all the elements of FIG. 23, but some of the elements may be omitted according to the use or condition. For example, when the information processing apparatus is used as the interface 103, the load balancer 104, the path search devices 105-1 to 105-4, the map information database 106, or the traffic information database 107, the input device 2103 and the output device 2104 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A path searching method performed by a computer, the path searching method comprising:

searching for, by using a processor, one node by a first search method from a plurality of nodes to be searched which have not yet been searched for and are adjacent to a node that is recorded as an already-searched-for node among a plurality of nodes, in a path search from a first node to a second node out of the plurality of nodes where information expressed by the plurality of nodes and a plurality of links each of which connects two nodes from the plurality of nodes and to each of which a cost is set is used;

recording a distance between the node searched for in the searching and the second node, and recording the node searched for as the already-searched-for node;

changing, by using the processor, the first search method to a second search method in which a number of nodes to be searched is prevented from increasing according to distances between the second node and two or more nodes recorded as the already-searched-for node obtained as a result of performing the searching and the recording two or more times; and generating, by using the processor, path information according to a node searched for by the second search method.

2. The path searching method according to claim 1, wherein
the changing includes comparing an average value of the distances between the second node and the two or more nodes recorded as the already-searched-for node with a threshold and changing the first search method to the second search method in which the number of nodes to be searched is prevented from increasing when the average value is greater than the threshold.

3. The path searching method according to claim 2, wherein
when the average value of the distances between the second node and the two or more nodes recorded as the already-searched-for node is smaller than the threshold, the threshold is changed to a smaller value to search for one node from a plurality of nodes to be searched by the first search method, and a distance between a node searched for and the second node is recorded and the node searched for is recorded as the already-searched-for node, and
when an average value of distances between the second node and two or more nodes recorded as the already-searched-for node obtained as a result of performing the searching and the recording two or more times after the threshold is changed is greater than the changed threshold, the first search method is changed to the second search method.

4. The path searching method according to claim 2, wherein
in the first search method, a type of road is classified into a plurality of groups depending on a distance, and a path search is performed according to the plurality of nodes and the plurality of links that correspond to a first group of roads corresponding to a distance between the first node and the second node, and
in the second search method, a path search is performed according to the plurality of nodes and the plurality of links that correspond to a second group of roads corresponding to a distance longer than the distance between the first node and the second node.

5. The path searching method according to claim 4, wherein
as the second group of roads, a group is selected that corresponds to a distance indicated by the average value of the distances between the second node and the two or more nodes searched for by the first search method and recorded as the already-searched-for nodes.

6. The path searching method according to claim 1, wherein
when a time elapses since a path search from the first node to the second node is started exceeds a specific period of time, the first search method is changed to the second search method regardless of the distances between the second node and the two or more nodes recorded as the already-searched-for node.

7. The path searching method according to claim 2, wherein
when the average value of the distances between the second node and the two or more nodes recorded as the already-searched-for node is greater than the threshold and a minimum value of the distances between the second node and the two or more nodes recorded as the already-searched-for node is greater than a specific value, the first search method is changed to the second search method.

8. The path searching method according to claim 1, wherein
in the first search method, a path search is performed according to a first weighted cost of the plurality of nodes to be searched, and
in the second search method, a path search is performed according to a second weighted cost different from the first weighted cost.

9. The path searching method according to claim 1, wherein
in the first search method, a path search is performed according to Dijkstra's algorithm, and
in the second search method, a path search is performed according to an A* algorithm.

10. A path search device comprising:
a memory; and
a processor that: searches for one node by a first search method from a plurality of nodes to be searched which have not yet been searched for and are adjacent to a node that is recorded as an already-searched-for node among a plurality of nodes, in a path search from a first node to a second node out of the plurality of nodes where information expressed by the plurality of nodes and a plurality of links each of which connects two nodes from the plurality of nodes and to each of which a cost is set is used; records in the memory a distance between the node searched for in searching and the second node, and records the node searched for in the memory as the already-searched-for node; changes the first search method to a second search method in which a number of nodes to be searched is prevented from increasing according to distances between the second node and two or more nodes recorded as the already-searched-for node obtained as a result of performing searching and recording two or more times; and generates path information according to a node searched for by the second search method.

11. A non-transitory computer-readable recording medium having stored therein a program for causing a computer to execute a process comprising:
searching for one node by a first search method from a plurality of nodes to be searched which have not yet been searched for and are adjacent to a node that is recorded as an already-searched-for node among a plurality of nodes, in a path search from a first node to a second node out of the plurality of nodes where information expressed by the plurality of nodes and a plurality of links each of which connects two nodes from the plurality of nodes and to each of which a cost is set is used;
recording a distance between the node searched for in the searching and the second node, and recording the node searched for as the already-searched-for node;
changing the first search method to a second search method in which a number of nodes to be searched is prevented from increasing according to distances between the second node and two or more nodes recorded as the already-searched-for nodes obtained as a result of performing the searching and the recording two or more times; and
generating path information according to a node searched for by the second search method.

* * * * *